United States Patent
Yasuo et al.

(10) Patent No.: US 7,269,129 B2
(45) Date of Patent: Sep. 11, 2007

(54) TRANSMITTING APPARATUS

(75) Inventors: Akihiro Yasuo, Kawasaki (JP);
Shigeatsu Samukawa, Kawasaki (JP);
Junichi Tamura, Kawasaki (JP);
Nobuyuki Umeda, Kawasaki (JP);
Hiroyuki Sato, Kawasaki (JP);
Tomohiro Shinomiya, Kawasaki (JP);
Jun Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1163 days.

(21) Appl. No.: 09/901,197

(22) Filed: Jul. 9, 2001

(65) Prior Publication Data
US 2002/0093971 A1 Jul. 18, 2002

(30) Foreign Application Priority Data
Jan. 16, 2001 (JP) ............................. 2001-007470

(51) Int. Cl.
*G01R 31/08* (2006.01)
(52) U.S. Cl. ........................... 370/217; 370/222; 714/2
(58) Field of Classification Search ...................... None
See application file for complete search history.

(56) References Cited

U.S. PATENT DOCUMENTS

| | | | |
|---|---|---|---|
| 5,179,548 A * | 1/1993 | Sandesara | 370/222 |
| 5,442,620 A * | 8/1995 | Kremer | 370/224 |
| 5,737,310 A * | 4/1998 | Goto | 370/222 |
| 6,414,771 B2 * | 7/2002 | Al-Salameh et al. | 398/48 |
| 6,594,232 B1 * | 7/2003 | Dupont | 370/224 |
| 6,614,754 B1 * | 9/2003 | Usuba et al. | 370/222 |
| 6,614,760 B1 * | 9/2003 | Suzuki et al. | 370/244 |
| 6,657,969 B1 * | 12/2003 | Neuendorff et al. | 370/245 |
| 6,721,268 B1 * | 4/2004 | Ohira et al. | 370/223 |
| 6,807,190 B1 * | 10/2004 | Kremer | 370/452 |
| 6,992,975 B1 * | 1/2006 | Daniel et al. | 370/222 |

* cited by examiner

*Primary Examiner*—Bob A. Phunkulh
(74) *Attorney, Agent, or Firm*—Katten Muchin Rosenman LLP

(57) ABSTRACT

Disclosed is a ring network in which a plurality of transmitting apparatuses are connected in ring form so as to be capable of transmitting in each of upstream and downstream directions, working and protection channels are assigned to each direction and, when failure occurs in a transmission path, a transmit signal is looped back using the protection channel to effect rescue. The ring network includes an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side. Monitoring is performed to determine whether communication between the insert and drop transmitting apparatus has become unrescuable owing to transmission-path failure. When communication has become unrescuable, the insert transmitting apparatus halts the transmission of the packet to the transmission path.

12 Claims, 29 Drawing Sheets

| VPI/VCI | APPARATUS CID | ENABLE | ROUTING TAG (OUTPUT PORT) | ----- |
|---------|---------------|--------|---------------------------|-------|
| : | 0 | 0 | | |
| : | 1 | 1 | | |
| : | 3 | 1 | | ----- |
| : | 4 | 1 | | |
| : | : | : | | |
| : | 65534 | 0 | | |

| APPARATUS CID | VRT |
|---------------|-----|
| 0 | |
| 1 | |
| 3 | ----- |
| 4 | VPI, VCI |
| : | (IP, Adr) |
| : | : |
| 65534 | |

FIG. 5

| VPI/VCI | APPARATUS CID | ENABLE | ROUTING TAG (OUTPUT PORT) | ----- | SQUELCH TABLE |
|---|---|---|---|---|---|
| : | 0 | 0 | | | |
| : | 1 | 1 | | | |
| : | 3 | 1 | | ----- | DEST NODE ID |
| : | 4 | 1 | | | |
| : | : | : | | | |
| : | : | : | | | |
| : | : | : | | | |
| : | 65534 | 0 | | | |

FIG. 6

| APPARATUS CID | VRT |
|---|---|
| 0 | |
| 1 | |
| 3 | ----- |
| 4 | VPI, VCI (IP Adr) |
| : | |
| : | |
| : | |
| 65534 | |

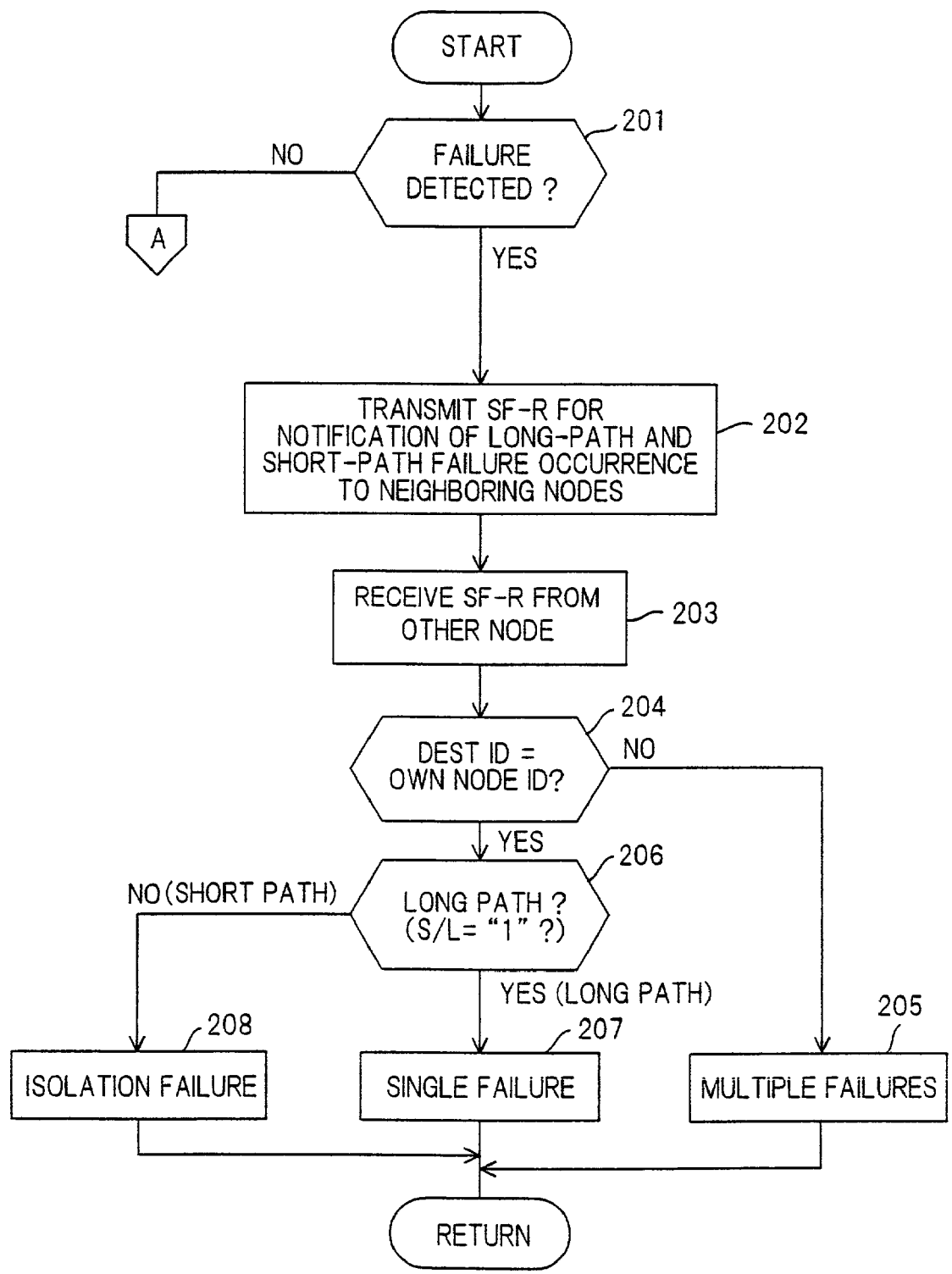

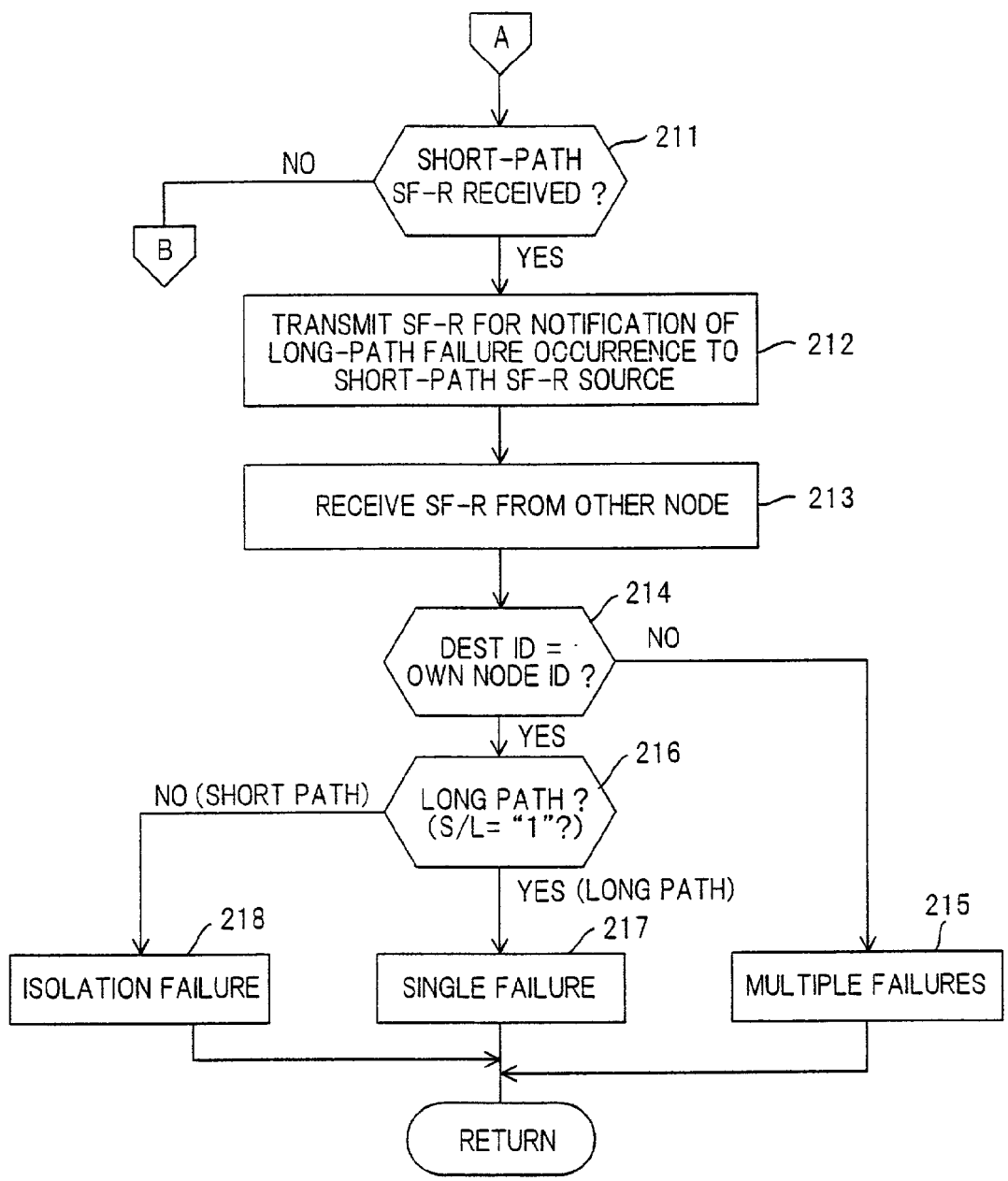

EAST→WEST (EW DIRECTION)

EAST←WEST (WE DIRECTION)

SQUELCH TABLE

|  | WEST SIDE | | EAT SIDE | | DIRECTION |
|---|---|---|---|---|---|
| Ch1 (CN1) | SOURCE | DESTINATION | SOURCE | DESTINATION | W ← E |
|  | DESTINATION | SOURCE | DESTINATION | SOURCE | W → E |
| ≀ | ≀ | ≀ | ≀ | ≀ | ≀ |
| Ch. n | ... | ... | ... | ... | ... |

TRANSMITTING APPARATUS

BACKGROUND OF THE INVENTION

This invention relates to a transmitting apparatus in a ring network and, more particularly, to a transmitting apparatus in a ring network in which a plurality of transmitting apparatus are connected in ring form so as to be capable of transmitting in each of upstream and downstream directions, working and protection channels are assigned to each direction and, when failure occurs in a transmission path, a transmit signal is looped back using the protection channel to effect rescue.

Frame Structure

Synchronous optical networks (SONET), which utilize optical communication that is capable of high-capacity transmission, have become widespread owing to an increase in communication traffic. With SONET, user data undergoes multiplexed transmission in accordance with a Synchronous Transport Signal (STS-N) frame (where N represents an integer) format. FIG. 23A is a diagram showing the structure of a 51.84-Mbps STS-1 frame. The frame has 9×90 bytes overall (810 bytes/125 μs), of which 3×9 bytes constitute overhead OH and 87×9 bytes constitute an STS payload STS-1 SPE (Synchronous Payload Envelope). Nine bytes of the payload constitute path overhead POH, and packets (VT packets) of multiple lower-order channels are multiplexed onto the remaining 86×9 bytes. With SONET, frame formats other than the STS-1 frame format mentioned above include STS-3 (155.52 Mbps), STS-12 (622.08 Mbps) and STS-48 (2.488 Gbps). These frame formats can be used in appropriate fashion by optical transmission lines.

VT (Virtual Tributary) packets are of various types, such as VT 1.5, VT 2, VT 3 and VT 6. A VT 1.5 packet is composed of 27 (=3×9) bytes, as shown in FIG. 23B, and the bit rate of one VT channel is 1.728 Mbps (=27×8/125 Mbps). FIG. 23C is a diagram useful in describing mapping of VT 1.5 packets into VT-structured STS-1 SPE. A first column is for path overhead POH, and $30^{th}$ and $59^{th}$ columns are for fixed stuff composed of all "1"s. As a result, the STS-1 SPE is divided into three areas of 28 columns each. The $1^{st}$ to $28^{th}$ columns of each area are assigned 1-1, 2-1, 3-1, 4-1, 5-1, 6-1, 7-1, 1-2, 2-2, . . . , 7-4 sequentially. VT 1.5 packets of the first channel are placed in the $2^{nd}$, $31^{st}$ and $60^{th}$ rows, VT 1.5 packets of the second channel are placed in the $3^{rd}$, $32^{nd}$ and $61^{th}$ rows, and VT 1.5 packets of the $28^{th}$ channel are placed in the $29^{th}$, $58^{th}$ and $87^{th}$ rows.

Ring Structure

A ring structure in which a transmitting apparatus is connected in the form of a ring from the viewpoint of assuring reliability is known as a network configuration for SONET. The ring structure is such that if a failure occurs in a transmission path, the transmission can be continued via an alternative transmission path, thereby making it possible to improve the reliability of transmission. FIG. 24 is a block diagram illustrating the structure of an ADM (Add/Drop Mux) transmitting apparatus that can be ring-connected. FIG. 25 is a diagram useful in describing the ring structure.

The ADM transmitting apparatus is terminal equipment having a MUX (multiplexing) function and an add/drop function. More specifically, the apparatus has a cross-connect function and an add/drop function for the lower-order side (tributary side). Line interfaces (LINE IF) 1a, 1b receive higher-order signals (e.g., OC-48: 2.488-Gbps optical signals) from optical transmission lines $8a_1$, $8b_1$ on WEST and EAST sides, respectively, convert these signals to electrical signals and execute processing based upon overhead information. Demultiplexers (DMUX) 2a, 2b demultiplex higher-order signals into lower-order signals (e.g., STS-1 electrical signals), a cross-connect unit 3 performs cross connect on the STS level, multiplexers (MUX) 4a, 4b multiplex the cross-connected STS-1 signals into higher-order signals and line interfaces (LINE IF) 5a, 5b add overhead onto these higher-order signals, convert the signals to optical signals and send the optical signals to optical transmission lines $8a_2$, $8b_2$ on the EAST and WEST sides, respectively. It should be noted that a signal direction in which a signal is input to the EAST side of the transmitting apparatus (node) and output from the WEST side shall be referred to as the EW (EAST→WEST) direction, and that a signal direction in which a signal is input to the WEST side of the transmitting apparatus (node) and output from the EAST side shall be referred to as the WE (WEST→EAST) direction.

The STS/VT cross-connect unit 3 switches, on the STS level, STS-1 signals inserted from tributary interfaces 6a, 6b, . . . via MUX/DMUXs 7a, 7b, . . . and sends these switched signals in the WE or EW direction. The STS/VT cross-connect unit 3 also drops signals, which have been received from the transmission path from the WE or EW direction, on the tributary side, demultiplexes these signals to lower-order signals of a prescribed speed via the MUX/DMUXs 7a, 7b, . . . and sends the signals to the tributary side from the tributary interfaces 6a, 6b, . . . . The transmission paths in the WE and EW directions both have working and protection channels assigned to them. For example, in case of OC-48, $1^{st}$ to $24^{th}$ channels of the 48 STS-1 channels are working channels and $25^{th}$ to $48^{th}$ channels are protection channels. The transmitting apparatus normally transmits signals using the working channel. When a failure occurs, rescue is performed using a protection channel.

Protection at Time of Transmission-path Failure

In accordance with the ring architecture, ADM transmitters 10a to 10d are connected in the form of a ring, as shown in FIG. 25. If a certain transmission path develops a failure or suffers a decline in quality, signals are transmitted in a direction that avoids this transmission path, thereby allowing communication to continue and assuring reliability and quality. Networks in which multiple nodes have been connected into a ring can be classified broadly into two types of schemes, namely a UPSR (Uni-directional Path Switched Ring) scheme and a BLSR (Bi-directional Line Switched Ring) scheme. In comparison with the UPSR scheme, the BLSR scheme is advantageous in that channel capacity can be enlarged because the same channel can be used between different nodes (spans).

The BLSR scheme is such that if failures occur at a plurality of locations and sever a ring transmission path, a signal that cannot reach a destination node may be produced and the signal may be transmitted to another node by loop-back for rescue purposes. In order to prevent such misconnection, squelch is performed. In the squelch operation, a P-AIS (Path Alarm Indication Signal) is transmitted upon inserting this signal in the signal of the channel that cannot reach the target node.

FIGS. 26A, 26B are diagrams useful in describing rescue from failure. With the UPSR scheme, as shown in FIG. 26A, the same signal is sent in the EW direction from a node (C) to a node (B) and in the WE direction from the node (C) to a node (D) by, e.g., a channel ch.1, and a node (A) selects and receives the signal of channel ch. 1 by a path switch PathSW. Accordingly, even if a failure develops between nodes (A) and (B), as shown in FIG. 26B, node (A) is capable of selecting and receiving the signal on channel ch.

1 via node (D) by the path switch PathSW, thereby allowing communication between nodes C and A to continue.

With the BLSR scheme, as shown in FIG. 26C, the node (C) sends a signal to node (A) by channel ch. 1 in, e.g., the EW direction and sends the signal to node (D) by channel ch. 1 in the WE direction, and node (D) sends the signal to node (A) by channel ch. 1 in the WE direction (the same channel is used in a different span). In other words, communication is possible between nodes (C) and (A), between nodes (C) and (D) and between nodes (D) and (A) using the same channel ch. 1. Channel capacity, therefore, can be enlarged as compared with the UPSR scheme.

The BLSR scheme is such that if a failure develops between nodes (A) and (B), as depicted in FIG. 26D, rescue is performed by an ASP (Automatic Protection Switch) protocol using K1, K2 bytes. With the APS protocol, the signal sent from node (C) to protection channel ch.1 is looped back to protection channel ch. 25 at node (B), and the protection channel ch. 25 is switched over to working channel ch. 1 at node (A), whereby communication between nodes (C) and (A) is allowed to continue. It should be noted that communication between nodes (C) and (D) is performed on channel ch. 1 and that communication between nodes (D) and (A) also is performed on ch. 1 because such communication does not traverse the faulty segment.

FIGS. 27 to 30 are diagrams useful in describing the APS protocol, in which WK represents a working channel and PT a protection channel (indicated by hatching. Nodes (A) to (H) are connected in a ring configuration by different transmission paths in each of WE and EW directions, and a working channel and protection channel are assigned to each transmission path.

FIG. 27 illustrates a case where communication is performed bi-directionally between nodes (A) and (E). If under these circumstances a failure occurs between nodes (F) and (E) in the transmission path in the EW direction, as shown in FIG. 28, node (E) detects the failure, becomes a switching node and sends the opposing node (F) switching requests (SF-RING; Signal Failure Ring) 51, 52, which indicate transmission-path failure, in both of short-path and long-path directions, respectively, in accordance with the APS protocol. If, upon receiving the switching requests, the nodes (D), (C), (B), (A), (H) and (G) recognize that the destination of request 52 is node (F) and not these nodes themselves, a state of full pass-through is established and the signal is allowed to pass through the protection channel. Upon receiving the request 51 on the short path, node (F) becomes a switching node, sends a reverse request (RR-RING; Reverse Request Ring) over the short path and sends a request 53 (SF-RING), which is identical with the received request 52, over the long path.

In the event of a failure, bridging and switching are executed simultaneously at reception of the request from the long path. Bridging represents a state in which the same traffic is sent by being switched from a working channel to a protection channel, and switching represents a state in which traffic from a protection channel is sent upon being switched to a working channel. Accordingly, owing to occurrence of the failure between nodes (F) and (E), node (E) forms a bridge and sends the signal destined for node (A) to the protection channel PT, as indicated by the dashed line in FIG. 29, and node (F) forms a switch for switching the protection channel PT to the working channel WK from node (F) in the direction toward node (A), as indicated by the dashed line in FIG. 29. The foregoing illustrates rescue of a signal from node (E) to node (A), though a signal from node (A) to node (E) can be rescued in a similar manner. More specifically, as shown in FIG. 30, in this case node (F) forms a bridge for looping back a signal, which was directed from node (A) to node (E) over the working channel, to the protection channel PT, and node (E) performs switching to switch from the protection channel PT to the working channel. Communication between nodes (E) and (A) can therefore continue.

The bytes K1, K2 used in the APS protocol are contained in the section overhead SOH, as shown in FIG. 31. The K1 byte comprises a switching request of $1^{st}$ to $4^{th}$ bits and a remote office ID (the identification number of the node that is the destination of the K1 byte) of $5^{th}$ to $8^{th}$ bits, and the K2 byte comprises a local office ID (the identification number of the node generating the request) of $1^{st}$ to $4^{th}$ bits, a $5^{th}$ bit (S/L bit) indicating whether the request is a short-path request ("0") or a long-path request ("1"), and status of $6^{th}$ to $8^{th}$ bits. The switching request of the K1 byte is such that "1011" represents the above-mentioned SF-RING, "0001" represents the RR-RING and "0000" represents no request. If status represented by the K2 byte is "111", this indicates an AIS (Alarm Indication Signal).

Squelch

Since the same channel can be used by multiple paths in a BLSR network, misconnection of paths occurs if failures develop at multiple locations. In order to prevent such misconnection, the P-AIS (Path Alarm Indication Signal) is inserted in the channel in which the misconnection occurred. This operation for inserting the P-AIS is referred to as "squelch". A squelch table is used to execute squelch. The content of a squelch table specifies the add/drop node of each channel and is set in each node. As shown in FIG. 32A, a node has EAST and WEST sides. The direction in which a signal advances from the EAST to the WEST side through the node is referred to as the EW direction, and direction in which a signal advances from the WEST to the EAST side through the node is referred to as the WE direction. As shown in FIG. 32B, the squelch table describes add/drop nodes in the WE and EW directions with regard to each of the EAST and WEST sides of the node on a per-channel basis. The add node is entered in the source-office name field of the squelch table and the drop node is entered in the destination-office name field. Accordingly, on the presumption that communication is performed bi-directionally between nodes (A) and (E), between nodes (A) and (C) and between nodes (C) and (E), as shown in FIG. 33, squelch tables SQTL-A through SQTL-H of respective ones of the nodes (A) through (H) become as illustrated. It should be noted that these squelch tables have been created using the node IDs of nodes (A) to (H).

The squelch tables are used to determine whether signals on respective channels can be rescued by loop-back if failures develop at two or more locations in a ring. There is the possibility that a signal judged to be unrescuable based upon the result of the determination made by a squelch table will be output from the wrong node, namely a node different from that intended. Squelch is executed if occurrence of such a misconnection is likely. The node that executes squelch is a switching node, and it does so when failures occur at two or more locations in a ring. Squelch is not executed in the following cases:

(1) when failures have occurred at both ends of the local node (i.e., when the local node is isolated);

(2) when a failure has not occurred on either side of the local node (i.e., when the local node is not a switching node); and (3) when bridging or switching is not actually being performed.

Reference will be had to FIG. 31 to describe squelch decision processing at node (E) in a case where failure has occurred between node (E) and (D) and between nodes (F) and (G) simultaneously. If squelch is not executed, a signal on channel ch. 1 from node (A) to node (E) is looped back to the protection channel ch. 25 by a bridging function at node (G), and the protection channel ch. 25 is looped back to the working channel ch. 1 by a switching function at node (D), thereby causing a misconnection in which the signal from node (A) to node (E) is transmitted to node (D). Further, a signal on channel ch. 1 from node (E) to node (C) is looped back to the protection channel ch. 25 by a bridging function at node (E), and the signal is looped back to the working channel ch. 1 by a switching function at node (F), thereby causing a misconnection in which the signal from node (E) to node (C) is transmitted to a lower-order group via node (E).

Accordingly, if multiple failures have occurred, (1) the locations of the failures are identified, (2) nodes at which signals will not arrive (so-called "signal non-arrival" nodes) owing to the failures are found from the ring topology, (3) reference is had to the squelch tables to determine whether the nodes that have been entered in these tables are nodes at which signals will not arrive, and (4) if a node is one at which a signal will not arrive, then squelch is executed.

Ring topology is the topology obtained by arraying the names of nodes that construct the ring clockwise in order starting from the node of interest. FIG. 34 illustrates ring topology RTG of node (E). It is ascertained from the faulty locations and ring topology RTG of FIG. 34 that nodes at which signals will not arrive from node (E) are the nodes of node IDs 9, 6, 4, 1, 14, 3. It is determined whether source and destination nodes that have been entered in a squelch table SQTL-E of node (E) match nodes at which signals will not arrive. Since it is found that node (C) of node ID 14 and node (A) of node ID 4 are nodes at which signals will not arrive, squelch is executed. In other words, squelch is executed at the switching nodes (D), (E), (F) and (G) by inserting P-AIS in each of the channel signals after bridging and after switching.

Construction of Ring Topology

FIGS. 35A, 35B are diagrams useful in describing the construction of a ring topology.

In a system in which four nodes (A) to (D) are connected by a ring transmission path RL, an identification number is assigned to each node, as shown in FIG. 35A. For example, 15, 3, 7 and 8 are assigned as the IDs of nodes (A), (B), (C) and (D), respectively. Next, as shown in FIG. 35B, (1) node (A), which specifies the construction of the ring topology (ring map), sends a ring topology frame RTGF, in which the inserted-node number is 1 and ID 15 of its own node is assigned to the first field. The ring topology frame RTGF is sent in the clockwise direction, by way of example. (2) Next, node (B) sends a ring topology frame RTGF, in which the inserted-node number is 2 and the ID of its own node is inserted following the ID of node (A). (3) Similarly, node (C) sends a ring topology frame RTGF, in which the inserted-node number is 3 and the ID of its own node is inserted following the ID of node (B), and (4) node (D) sends a ring topology frame RTGF, in which the inserted-node number is 4 and the ID of its own node is inserted following the ID of node (C).

(5) Since the first inserted-node ID is its own node ID, node (A) recognizes that the frame has come full circle and, as shown in FIG. 35C, transmits the ring topology frame RTGF upon inserting an END flag at the end thereof, whereby each node is notified of the completed ring topology frame. Each node that has received this ring topology frame constructs a ring topology with its own node at the head. For example, the ring topology is "15, 3, 7, 8" at node (A), "3, 7, 8, 15" at node (B), "7, 8, 15, 3" at node (C) and "8, 15, 3, 7" at node (D). Such a ring topology makes it easy to send a local node ID and a target node ID using the K1, K2 bytes in accordance with the APS protocol.

With conventional ring networks, a VT channel is assigned to a user permanently. Consequently, even if communication becomes impossible owing to occurrence of multiple failures and squelch is executed on a prescribed channel in accordance with the BLSR scheme, there is no effect upon the traffic of other channels that flows through the ring network. That is, even if squelch is carried out at a node where loop-back is in effect owing to failure and P-AIS is inserted into this channel, there is no influence upon the traffic of other channels.

However, in a ring network in which a VT channel is assigned to a user permanently, as in the prior art, the bandwidth (1.728-Mbps) of the user channel is not used unless the user communicates. This means that transmission band is not utilized effectively. According, there has been proposed a ring network in which communication is performed upon setting up an arbitrary connection dynamically for a transmission path which has an empty transmission band. This ring network transmits packets (IP packets, ATM cells, etc.) having various connection IDs upon mapping the packets into the payload of a POS (Packet Over Sonet or Packet Over SDH) frame.

However, a problem with this proposed ring network is that needless traffic flows through the ring when multiple failures occur. FIGS. 36A, 36B are diagrams useful in describing this problem of the proposed ring network, in which FIG. 36A is a diagram useful in describing the path of a packet (assumed to be ATM cells) in a ring network in which a failure has not occurred, and FIG. 36B is a diagram useful in describing a P-AIS route in a case where failures have occurred between nodes F and G and between nodes D and E. The dashed line in FIG. 36B indicates the route along which the P-AIS flows. Consider a case where squelch has been carried out and the P-AIS inserted by node G, at which loop-back is performed, in a manner similar to that of the BLSR scheme in conventional SONET.

An ATM cell that has been inserted from node A passes through node H and is looped back at node G. Owing to multiple failures, however, P-AIS is inserted and communication continues (as indicated by the dashed line). When squelch is executed at node G where loop-back is being performed, however, an ordinary ATM cell flows through the section of the ring (indicated by the solid line) from the insert node (node A) to the node (node G) performing loop-back. Since this ATM cell is discarded by squelch at the loop-back node, needless traffic TRF flows through in the ring.

A packet communication network based upon POS is characterized in that it assigns a transmission band in response to a connection request by a best-effort service when there is an empty transmission band, thereby making it possible to use transmission band effectively.

SUMMARY OF THE INVENTION

Accordingly, an object of the present invention is to so arrange it that needless traffic (packets) will not flow through a ring network when squelch is executed.

Another object of the present invention is to so arrange it that when an insert transmitting apparatus stops sending a packet to a ring network to thereby execute squelch, the fact that an unrescuable failure has occurred is reported to the lower-order transmission source of this packet.

Another object of the present invention is to so arrange it that each transmitting apparatus of a ring network is capable of readily discriminating the fact that a failure has occurred at a plurality of locations in the network.

Yet another object of the present invention is to so arrange it that a drop transmitting apparatus can be identified on a per-connection basis, thereby making it possible to execute squelch upon discriminating, on a per-connection basis, the fact that communication has become impossible between an insert transmitting apparatus and a drop transmitting apparatus.

A further object of the present invention is to make it possible to execute squelch in a point-to-multipoint drop connection which transmits the same packet from one insert transmitting apparatus to a plurality of drop transmitting apparatuses.

A further object of the present invention is to make it possible to execute squelch in a multipoint-to-point insert connection which transmits packets from a plurality of insert transmitting apparatuses to one drop transmitting apparatus using the same connection ID.

According to the present invention, the foregoing objects are attained by providing a ring-network transmitting apparatus comprising: (1) rescue-impossible detection means for detecting that communication between an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side, has become unrescuable owing to transmission-path failure; and (2) packet-transmission halting means for halting transmission of the packet to the transmission path when communication has become unrescuable. Specifically, the transmitting apparatus further comprises failure-occurrence detection means. The failure-occurrence detection means detects that multiple failures have occurred at multiple locations in a transmission path and obtains a signal non-arrival range within which a signal does not arrive owing to multiple failures at multiple locations and the rescue-impossible detection means determines that rescue is impossible when the drop transmitting apparatus resides in the signal non-arrival range.

Thus, the present invention is such that if an insert transmitting apparatus and a drop transmitting apparatus become isolated from each other owing to transmission-path failure, thereby making communication of a prescribed packet impossible, transmission of this packet to the ring network is halted. As a result, needless traffic (packets) will not flow through the ring network at execution of squelch, transmission band is not wasted and it can be utilized effectively.

Further, when a connection pair consisting of an upstream connection and a downstream connection is set up, the upstream connection becomes unrescuable owing to transmission-line failure and squelch is executed, failure reporting means reports occurrence of an unrescuable failure to a packet transmit terminal on a lower-order side via the downstream connection of the connection pair. If this arrangement is adopted, the packet transmit terminal on a lower-order side is capable of subsequently halting transmission of a packet.

Further, a table for converting a connection ID of a packet to an in-apparatus ID is provided, wherein an apparatus ID of a packet drop transmitting apparatus, together with an in-apparatus ID, is retained in the table in association with the connection ID. If this arrangement is adopted, the rescue-impossible detection means can readily obtain a drop transmitting apparatus of a packet, which enters from the lower-order side, from the table when failures occur at multiple locations, and can thereby determine whether the drop transmitting apparatus is present in the signal non-arrival range to readily recognize whether rescue has become impossible.

Further, in accordance with the present invention, squelch can be executed in a point-to-multipoint drop connection that transmits the same packet from one insert transmitting apparatus to a plurality of drop transmitting apparatuses. Specifically, in a case where the same connection ID is used in different spans of a network, the apparatus ID of a drop transmitting apparatus farthest from the insert transmitting apparatus in the direction of packet transmission is retained in the table, and the rescue-impossible detection means obtains a farthest-end drop transmitting apparatus from the table when failures occur at multiple locations, and determines whether this drop transmitting apparatus resides in the signal non-arrival range to thereby recognize whether rescue has become impossible. Further, in a case where the same connection ID is not used in different spans of a network, the rescue-impossible detection means determines whether the nearest drop transmitting apparatus in the direction of packet transmission resides in the signal non-arrival range to thereby recognize whether rescue has become impossible.

Further, in accordance with the present invention, squelch can be executed in a multipoint-to-point insert connection that transmits a packet from a plurality of insert transmitting apparatuses to one drop transmitting apparatus using the same connection ID. Specifically, in a case where the same connection ID is not used in a different span of a network, an apparatus ID of a drop transmitting apparatus is retained in association with the connection ID in the table of each insert transmitting apparatus, and the rescue-impossible detection means of each insert transmitting apparatus obtains a multipoint-to-point drop transmitting apparatus from the table when failures occur at multiple locations and decides that rescue has become impossible when the drop transmitting apparatus resides in the signal non-arrival range.

Further, in accordance with the present invention, a multipoint-to-point insert connection and a point-to-multipoint drop connection are set up as a pair and, when a prescribed insert connection becomes unrescuable owing to transmission-path failure and squelch is executed, occurrence of an unrescuable failure is reported to a packet transmit terminal on a lower-order side via the drop connection of the pair. If this arrangement is adopted, the packet transmitting apparatus on the lower-order side is capable of subsequently halting transmission of a packet.

Other features and advantages of the present invention will be apparent from the following description taken in conjunction with the accompanying drawings.

BRIEF DESCRIPTION OF THE DRAWINGS

FIG. 5 is a diagram useful in describing an upstream VRT;

FIG. 6 is a diagram useful in describing a downstream VRT;

FIG. 13 is a flowchart (part 1) of processing for detecting occurrence of multiple failures;

FIG. 14 is a flowchart (part 2) of processing for detecting occurrence of multiple failures;

DESCRIPTION OF THE PREFERRED EMBODIMENTS (A) Structure of Transmitting Apparatus (a) Overall Structure FIG. 1 is a block diagram illustrating a transmitting apparatus according to the present invention. The apparatus includes higher-order input-side ring interfaces (RING IF) $51_1$ to $51_4$ connected to respective ones of transmission paths; an ATM switch 52; higher-order output-side ring interfaces (RING IF) $53_1$ to $53_4$ connected to respective ones of transmission paths; a monitoring controller 54; lower-order input-side low-speed interfaces (tributary interfaces IF) $55_1$ to $55_n$; and lower-order output-side low-speed interfaces (tributary interfaces IF) $56_1$ to $56_n$. BLSR schemes for ring networks include (1) a 2-fiber BLSR scheme and (2) a 4-fiber BLSR scheme. The transmitting apparatus shown in FIG. 1 is illustrative of the 4-fiber BLSR scheme.

As shown in FIG. 2A, a 2-fiber BLSR scheme uses one transmission path (fiber) in each of the WE and EW directions. A working channel (Work) and a protection channel (Extra or Protection) are assigned to each transmission path. If a failure occurs in one transmission path, loop-back is performed so that the signal is transmitted via the protection channel of the other transmission path. Under normal conditions in which failure has not occurred, the protection channel is used as if it were a working channel and transmits the signal (i.e., is used as an extra channel). When a failure occurs, this channel acts as a protection channel and performs loop-back.

As shown in FIG. 2B, a 4-fiber BLSR scheme uses two transmission paths (fibers) in each of WE and EW directions. Working transmission paths ULWI, ULWO and protection transmission paths ULSI, ULSO are provided on input and output sides, respectively, in the WE direction, and working transmission paths DLWI, DLWO and protection transmission paths DLSI, DLSO are provided on input and output sides, respectively, in the EW direction. The 4-fiber BLSR scheme differs from the 2-fiber BLSR scheme in that the former accommodates the working and protection channels in different fibers. Since the working channel is halved when protection is performed with the 2-fiber scheme, traffic for which bandwidth is assured must be accommodated in half the channel or less. With the 4-fiber scheme, all traffic can be looped back using the protection fibers.

(b) Input-side Ring Interface

Figure 1:
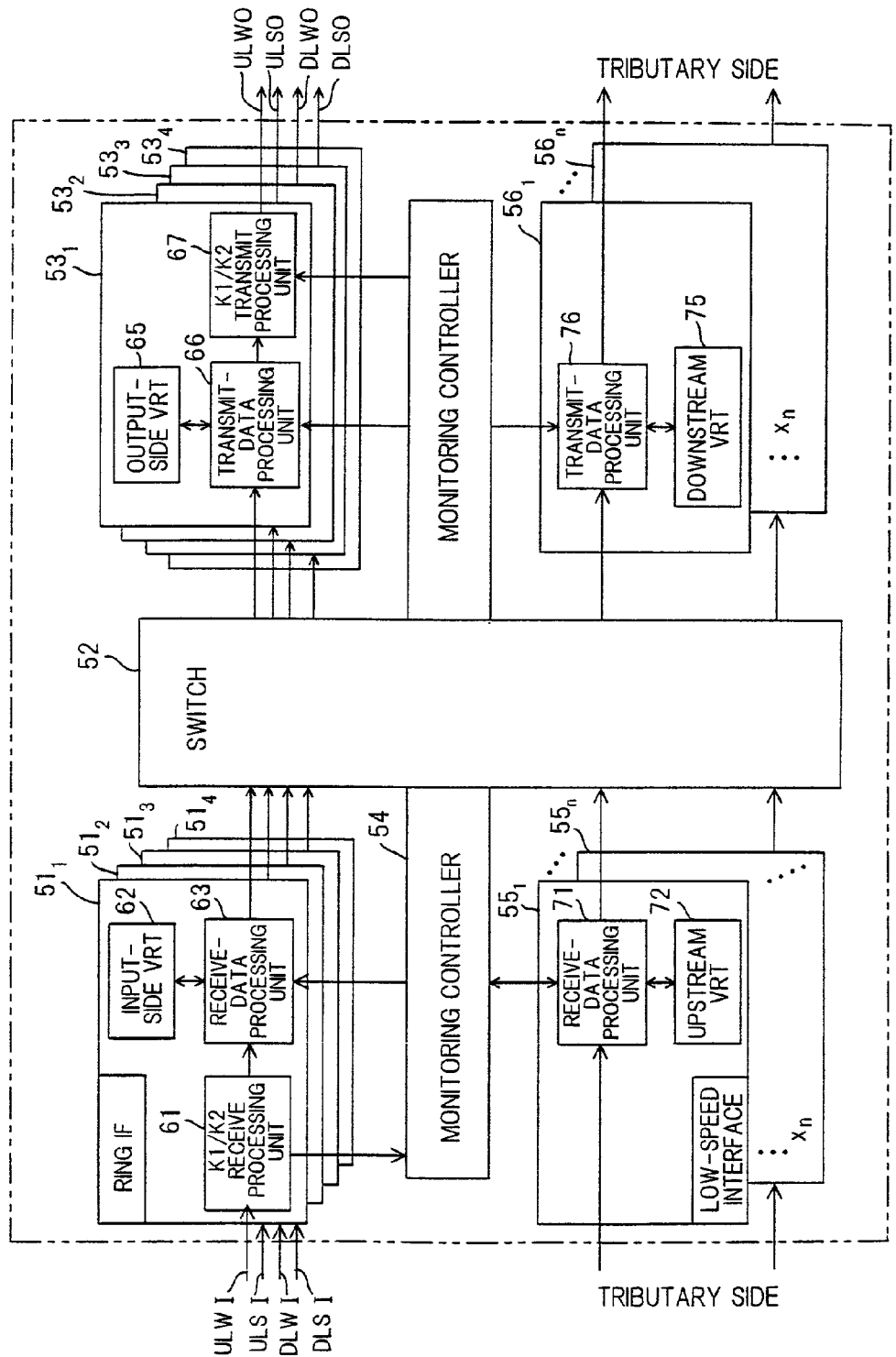
FIG. 1 is a block diagram illustrating a transmission apparatus according to the present invention.
Figure 2A:
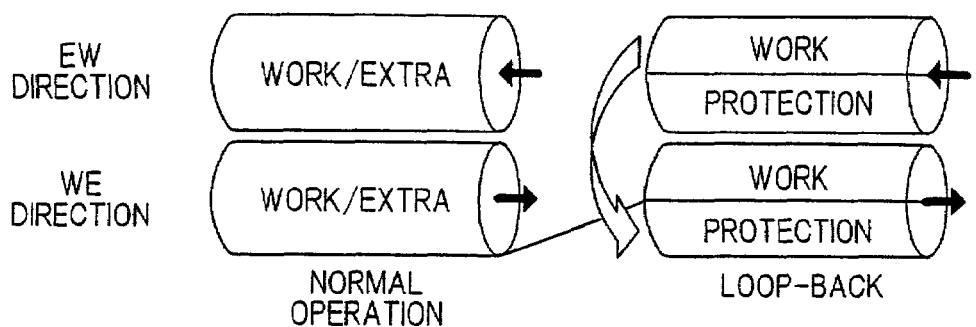
FIGS. 2A and 2B are diagrams useful in describing 2-fiber and 4-fiber BLSR schemes.
Figure 2B:
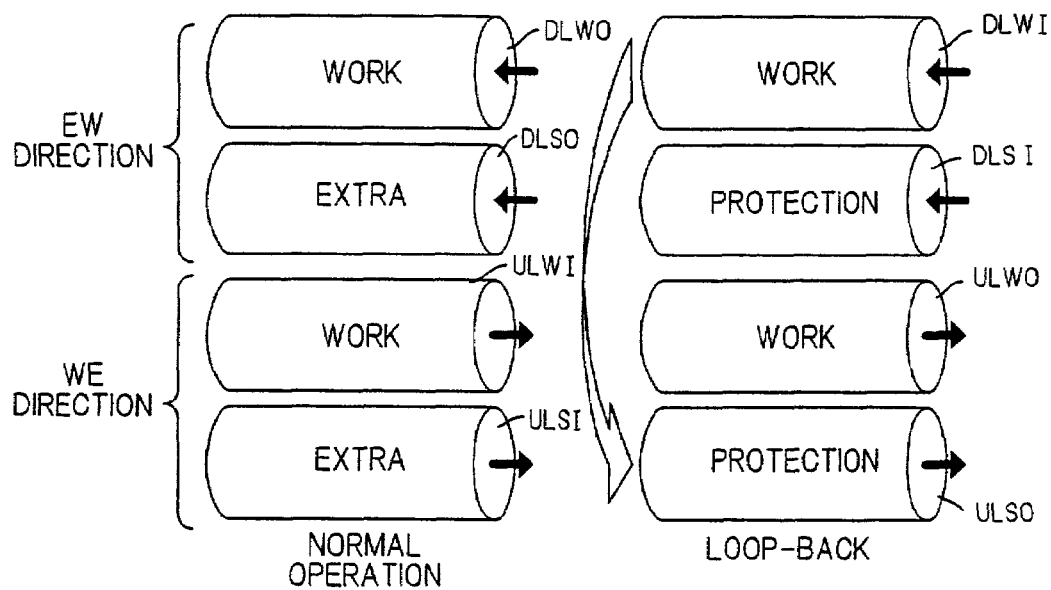
Figures 3, 4A, 4B:
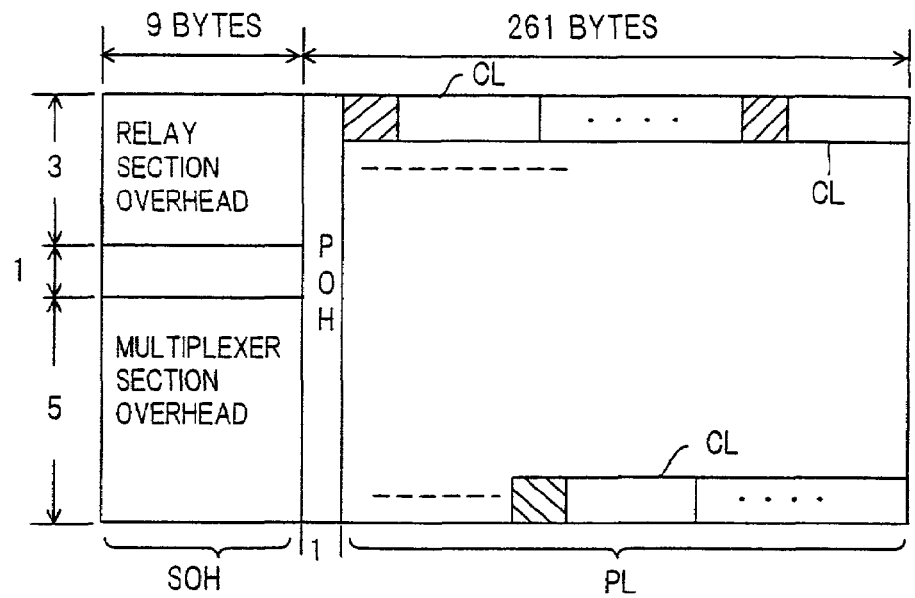
FIG. 3 is a diagram useful in describing a SONET OC-3 frame format.
FIGS. 4A and 4B are diagrams useful in describing input-side and output-side VRTs (Virtual Routing Tables), respectively.
Figure 31:
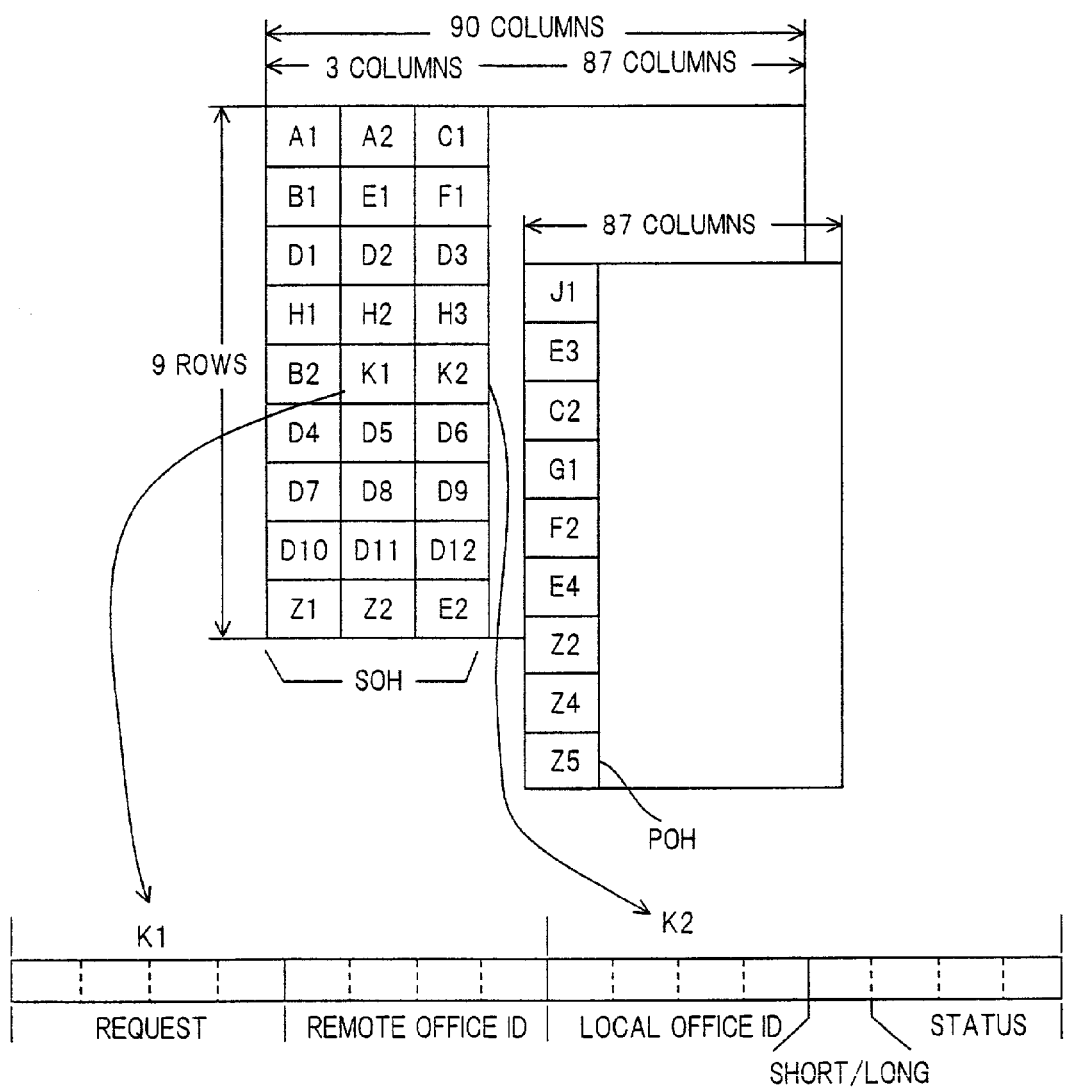
FIG. 31 is a diagram useful in describing K1 and K2 bytes.
Figures 32A, 32B:
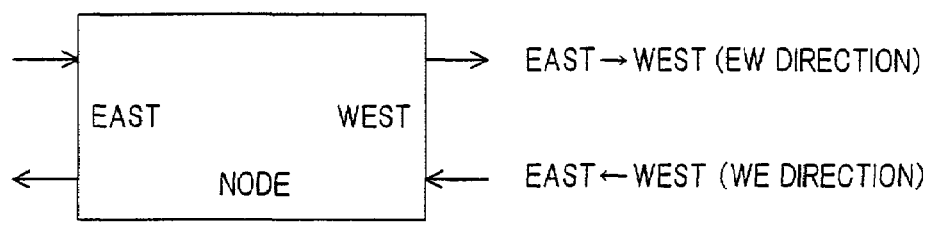
FIGS. 32A and 32B are diagrams useful in describing a squelch table according to the prior art.
Figure 33:
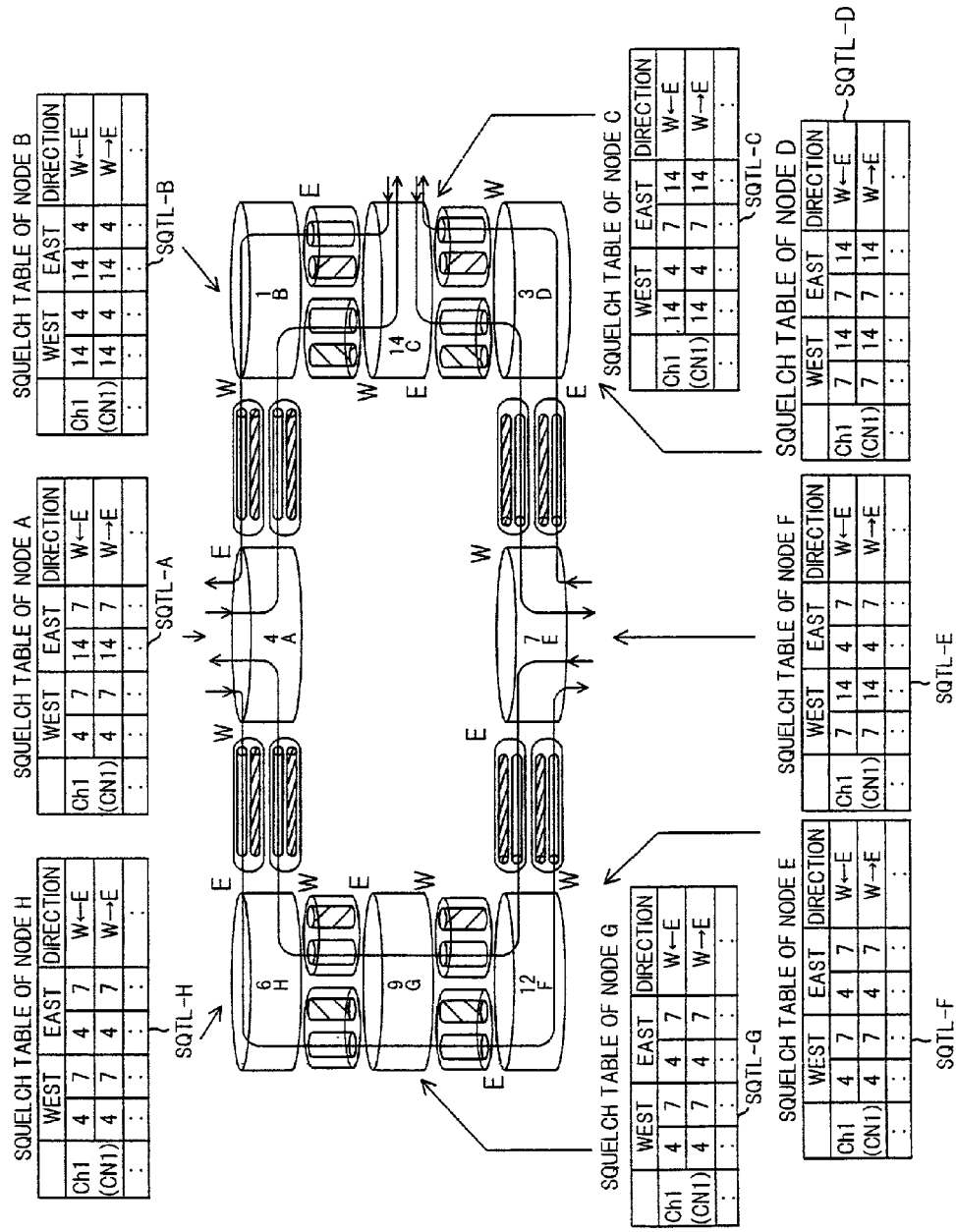
FIG. 33 is a diagram useful in describing squelch tables of respective nodes in a ring network according to the prior art.
Figure 34:
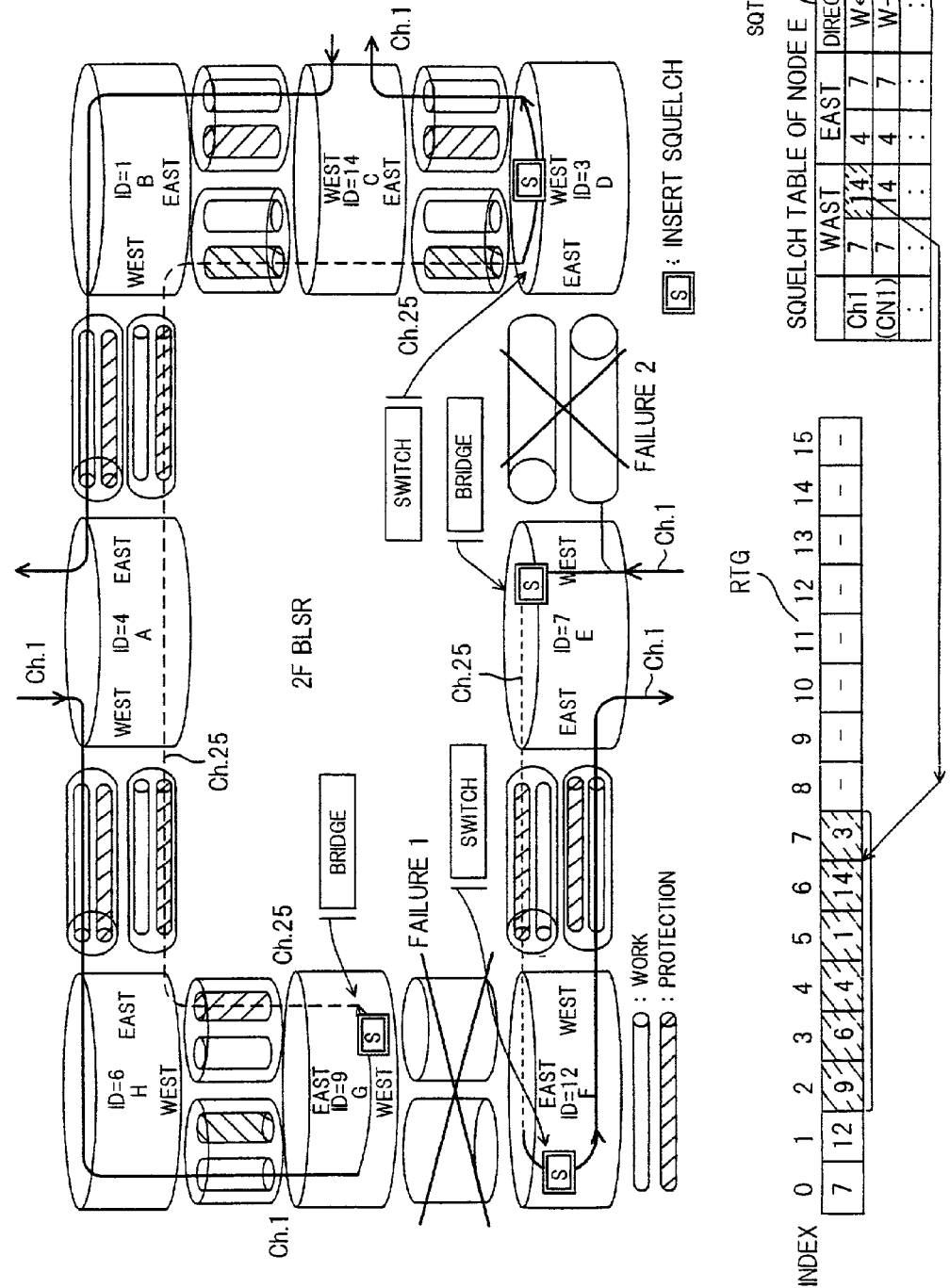
FIG. 34 is a diagram useful in describing processing for deciding squelch in the event of a failure according to the prior art.
Figure 35A:
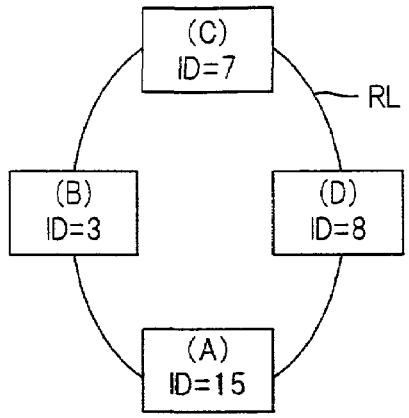
FIGS. 35A to 35C are diagrams useful in describing the construction of a ring topology according to the prior art.
Figure 35B:
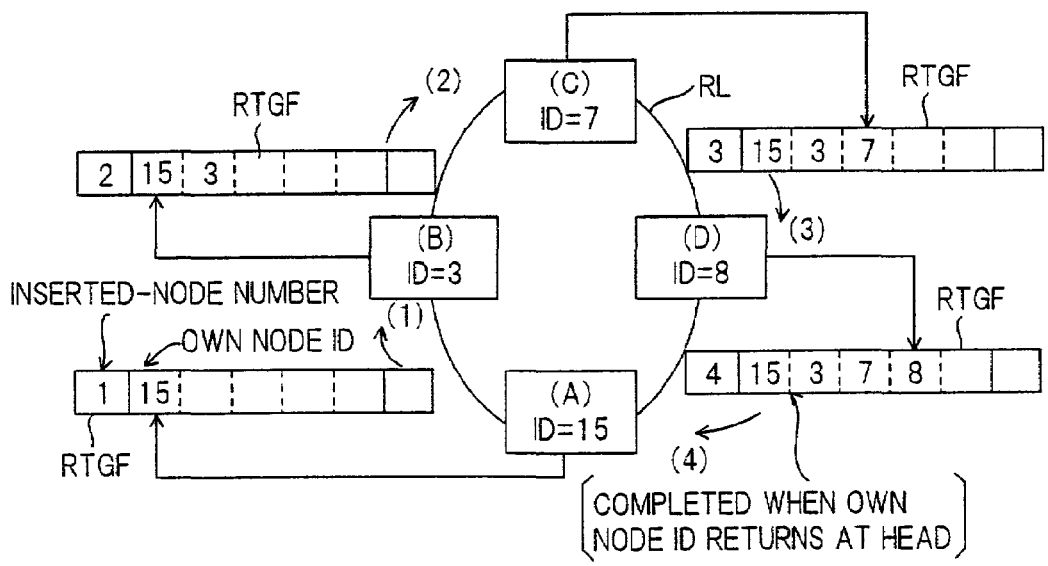
Figure 35C:
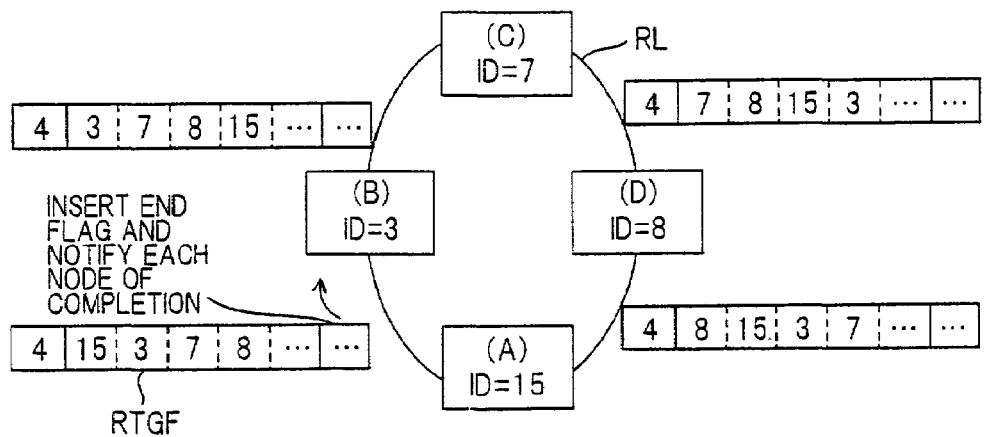

The input-side ring interfaces $51_1$ to $51_4$ are identically constructed and each has a K1/K2 receive processing unit 61, an input-side VRT (Virtual Routing Table) 62 and a receive-data processing unit 63. The K1/K2 receive processing unit 61 receives a SONET or SDH (SONET will be assumed below) frame signal, converts the optical signal to an electrical signal, separates ATM cells and overhead from this SONET frame and inputs the K1/K2 bytes, which are included in the section overhead, to the monitoring controller 54. FIG. 3, which is a diagram showing the structure of a SONET frame used in the ring network of the present invention, illustrates an OC-3 format. FIG. 3 is one example and OC-48, OC-96, etc., may be used in actual practice. The SONET OC-3 (STS-3) frame is composed of 9×270 bytes, in which the initial 9×9 bytes constitute section overhead SOH and the remaining bytes constitute path overhead POH and payload PL. The section overhead SOH includes various control bytes, such as the K1/K2 bytes, as shown in FIG. 31. Further, ATM cells are mapped into the payload PL.

As shown in FIG. 4A, the input-side VRT 62 retains (1) in-apparatus connection identifiers (CID), (2) enable data and (3) routing tags (output port numbers) in association with VPI/VCIs (connection IDs) contained in the header of an ATM cell. The enable data is "1" if use of the VPI/VCI is allowed and is "0" if use of the VPI/VCI is not allowed. The receive-data processing unit 63 converts the VPI/VCI of a cell header, which enters from the K1/K2 receive processing unit 61, to an apparatus CID, adds a routing flag onto a cell and outputs the cell to the ATM switch 52.

(c) Output-side Ring Interface

The output-side ring interfaces $53_1$ to $53_4$ are identically constructed and each has an output-side VRT 65, a transmit-data processing unit 66 and a K1/K2 transmit processing unit 67. As shown in FIG. 4B, the output-side VRT 65 stores VPI/VCIs (connection IDS) in association with apparatus CIDS. The transmit-data processing unit 66 converts the apparatus CID of a cell, which enters from the ATM switch 52, to a VPI/VCI upon referring to the output-side VRT 65. The K1/K2 transmit processing unit 67 creates overhead, which includes the K1/K2 bytes, in accordance with a command from the monitoring controller 54, maps ATM cells into the payload of a SONET frame, converts the frame signal from an electrical to an optical signal and sends the signal to the transmission path.

(d) Input-side Low-speed Interface

Each of the input-side low-speed interfaces $55_1$ to $55_n$ has a receive-data processing unit 71 and an upstream VRT 72. As shown in FIG. 5, the upstream VRT 72 retains (1) in-apparatus connection identifiers (apparatus CIDS), (2) enable data, (3) routing tags (output port numbers) and (4) squelch table information in association with VPI/VCIs (connection IDS) contained in the header of an ATM cell that enters from a tributary side. The enable data is "1" if use of the VPI/VCI is allowed and is "0" if use of the VPI/VCI is not allowed. The squelch table information indicates the identifier (destination node ID: Dest Node ID) of a drop transmitting apparatus that drops an ATM cell entering from a tributary. This information is used when determining whether or not to execute squelch.

Figure 7:
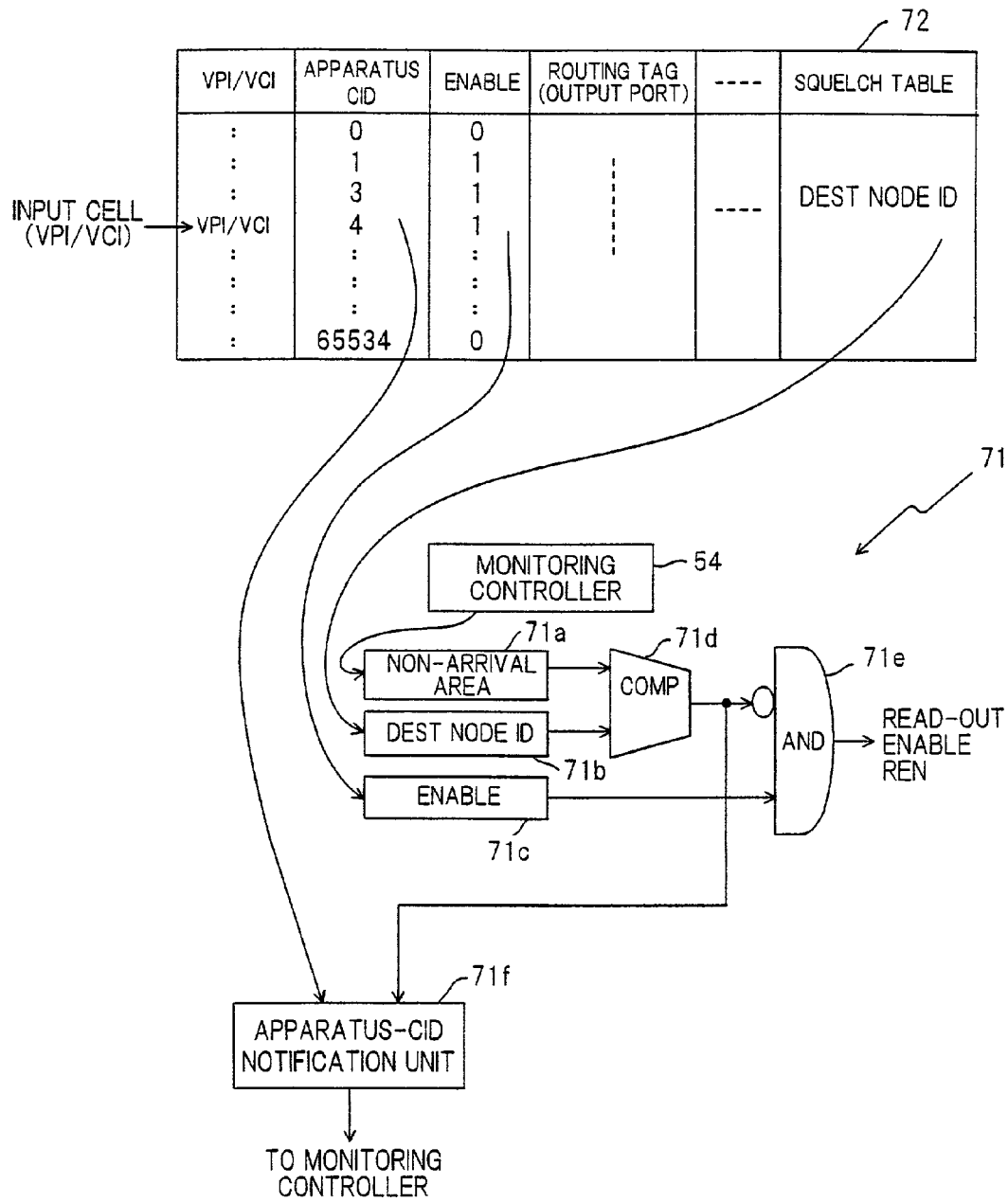
FIG. 7 illustrates a squelch-execution discriminating circuit.

The receive-data processing unit 71 converts the VPI/VCI of a cell header, adds a routing tag onto the cell and then outputs the cell to the ATM switch 52, and also determines through hardware whether to execute squelch using the squelch table information. FIG. 7 is a diagram showing a hardware implementation for determining whether squelch should be executed or not. Upon detecting the occurrence of failures at multiple locations in the ring network by referring to the K1/K2 bytes that enter the ring interfaces $51_1$, $51_3$ from the upstream/downstream working transmission paths ULWI, DLWI, the monitoring controller 54 outputs non-arrival range data that includes a node ID specifying a node that can no longer communicate. The receive-data processing unit 71 has a storage unit 71a for storing the non-arrival range data, a register 71b for reading a destination node ID, which corresponds to the VPI/VCI of an ATM cell that enters from the tributary side, from the upstream VRT 72 and storing this node ID, a register 71c for similarly storing enable data, and a comparator 71d for comparing the destination node ID (Dest Node ID) and the node ID contained in the non-arrival range data and determining whether the destination node (drop transmitting apparatus) is a node within the non-arrival range data.

If a node ID that agrees with the destination node ID is not contained in the non-arrival range data, i.e., if the insert transmitting apparatus of interest is capable of transmitting with the drop transmitting apparatus (the output of the comparator 71d is "0") and the enable data is "1", then an AND gate 71e outputs a high-level read-enable signal REN. As a result, the receive-data processing unit 71 changes the VPI/VCI of an ATM cell that enters from the tributary side, adds a routing tag onto the header and inputs the resultant signal to the ATM switch 52.

On the other hand, if a node ID that agrees with the destination node ID is contained in the non-arrival range data, i.e., if the insert transmitting apparatus of interest is not capable of transmitting with the drop transmitting apparatus (the output of the comparator 71d is "1"), then it is judged that the failure is unrescuable and the AND gate 71e does not output the read-enable signal REN. As a result, the receive-data processing unit 71 does not output the ATM cell, which has entered from the tributary side, to the switch, i.e., does not send the ATM cell to the transmission path. (In other words, squelch is executed). Further, an apparatus-CID notification unit 71f notifies the monitoring controller 54 of the apparatus CID corresponding to the VPI/VCI for which squelch has been executed. The monitoring controller 54 saves the reported apparatus CID and inputs this CID to the low-speed interface 56 on the output side periodically. If the apparatus CID enters from the monitoring controller 54, the low-speed interface 56 obtains, from a downstream VRT 75, the VPI/VCI corresponding to this apparatus CID of the set pair, creates an OAM cell (P-AIS) of this VPI/VCI and sends the OAM cell to the tributary side to notify the terminals downstream.

(e) Output-side Low-speed Interface

Each of the output-side low-speed interfaces $56_1$ to $56_n$ has a downstream VRT 75 and a transmit-data processing unit 76. As shown in FIG. 6, the downstream VRT 75 stores the VPI/VCIs of ATM cells, which are sent to the tributary side, in association with apparatus CIDs. The relationships between apparatus CIDs and VPI/VCIs are obtained merely by reversing the array of the relationship between VPI/VCIs and apparatus CIDs stored in the upstream VRTs 72 of the input-side low-speed interfaces $55_1$ to $55_n$ corresponding to the output-side low-speed interfaces $56_1$ to $56_n$. That is, connection settings are established in pairs upstream and downstream. The transmit-data processing unit 76 refers to the downstream VRT 75, converts the apparatus CID of an ATM cell that enters from the switch 52 to a VPI/VCI and outputs the CID to the tributary side. Further, the transmit-data processing unit 76 periodically receives, from the monitoring controller 54, the apparatus CID corresponding to a VPI/VCI for which squelch has been executed, obtains the VPI/VCI corresponding to this apparatus CID from the downstream VRT 75, creates an OAM cell (P-AIS) having this VPI/VCI and sends the OAM cell to the terminal on the tributary side.

(B) First Embodiment of Squelch Execution (a) First Embodiment

Figure 8:
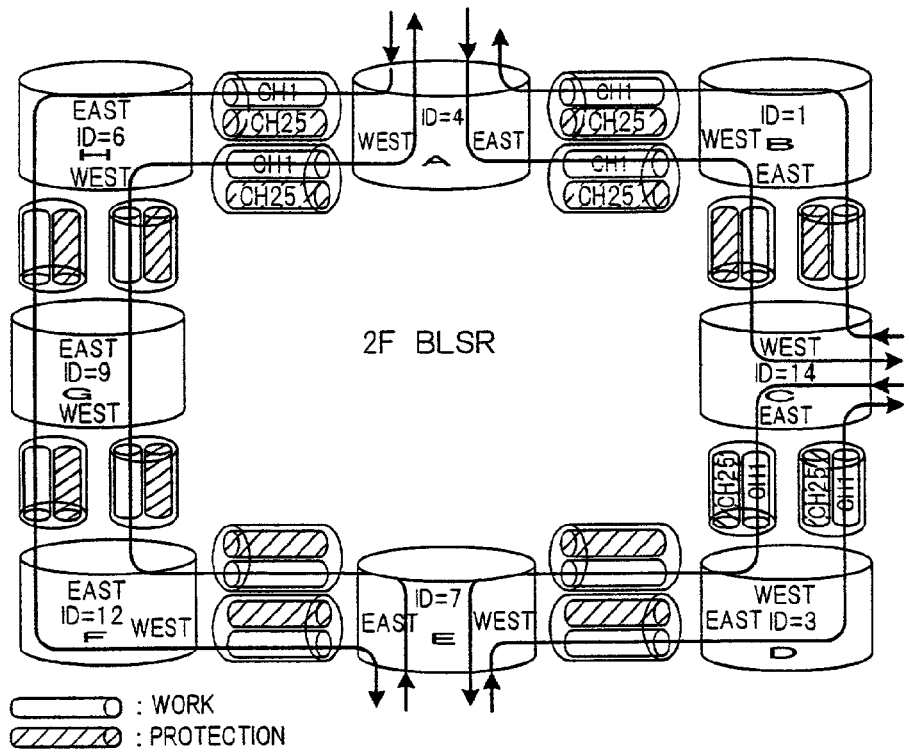
FIG. 8 is a diagram useful in describing a communication route when operation is normal.
Figure 9:
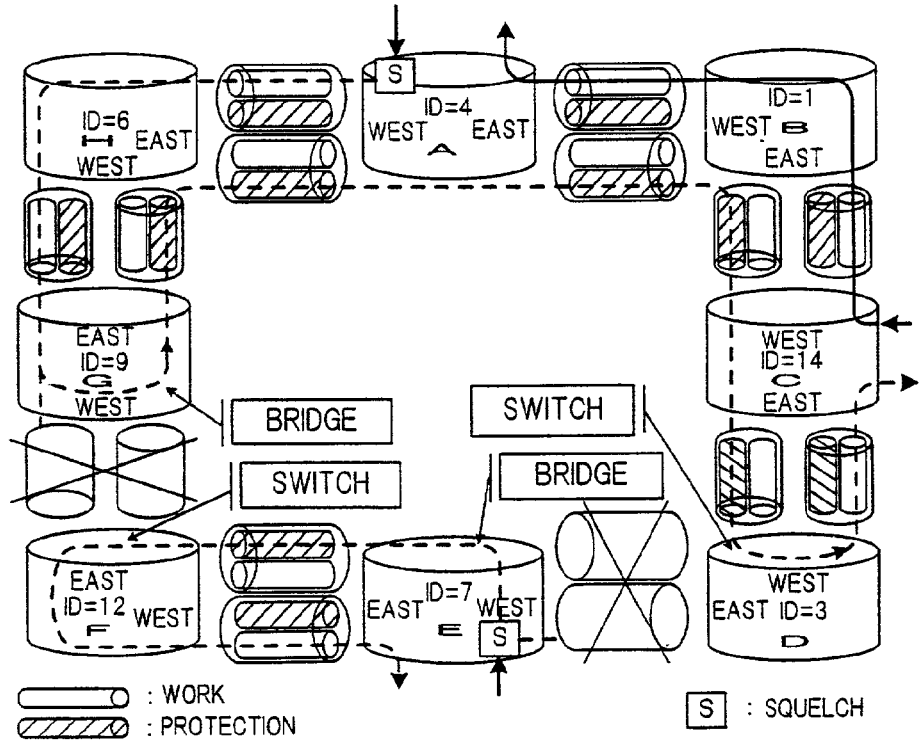
FIG. 9 is a diagram useful in describing a case where squelch is executed at an insert node.

FIGS. 8 and 9 are diagrams useful in describing a first embodiment in which squelch is executed by an insert transmitting apparatus (insert node). As shown in FIGS. 8 and 9, a ring network is constructed by nodes A to H. When operation is normal, communication between nodes is carried out as indicated by the solid lines in FIG. 8. If in this case multiple failures occur between nodes D and E and between nodes F and G, as shown in FIG. 9, giving rise to a connection over which communication is not possible, then, in the first embodiment, squelch processing for dealing with this connection is implemented at insert nodes A, E of the connection. In other words, the insert nodes A, E halt the transmission of connection packets to the transmission path. As a result, needless cells that cannot be communicated are prevented from flowing through the ring, thereby allowing bandwidth to be exploited effectively. In the prior art, cells flow along the route indicated by the dashed lines in FIG. 9. In the present invention, on the other, no such cells flow in the network.

In summation, with the BLSR scheme according to conventional SONET (SHD), a node at which loop-back is performed executes squelch by inserting P-AIS in regard to a connection for which there is a possibility of misconnection, as described above in conjunction with FIG. 36B. However, this method wastes bandwidth because needless traffic flows in the network. According to the present invention, squelch in regard to a connection for which there is a possibility of misconnection is executed by performing an operation that halts cell transmission at the insert node located at the entrance to the ring. This eliminates the occurrence of needless traffic in the ring so that channels within the ring are utilized effectively.

(b) Modification

Figure 36A:
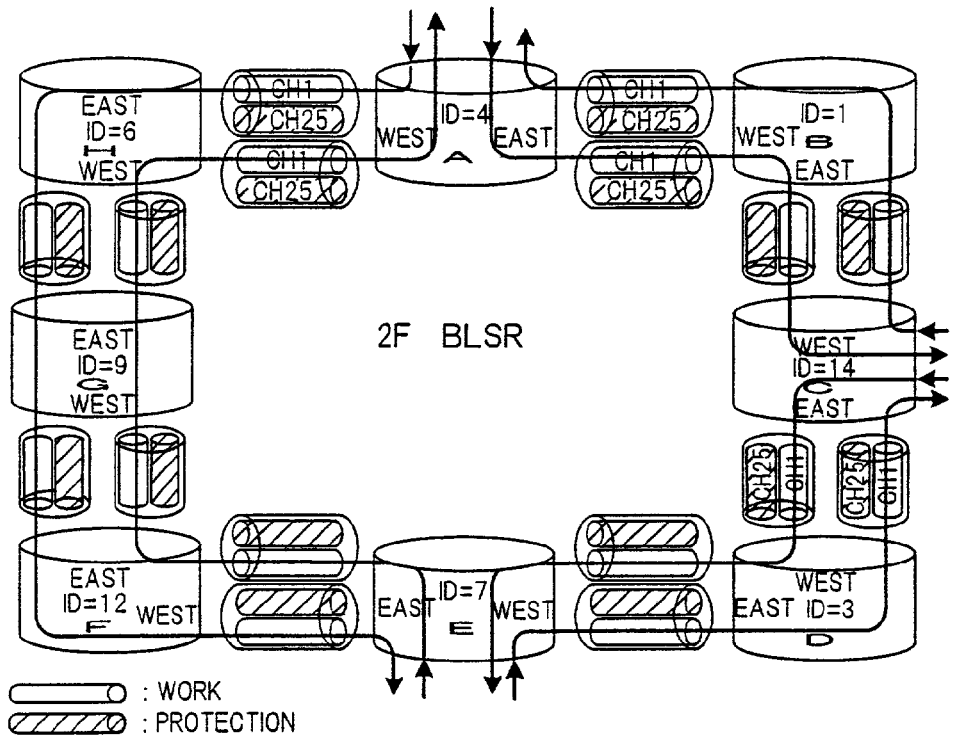
FIGS. 36A and 36B are diagrams useful in describing problems of a ring network based upon POS according to the prior art.
Figure 36B:
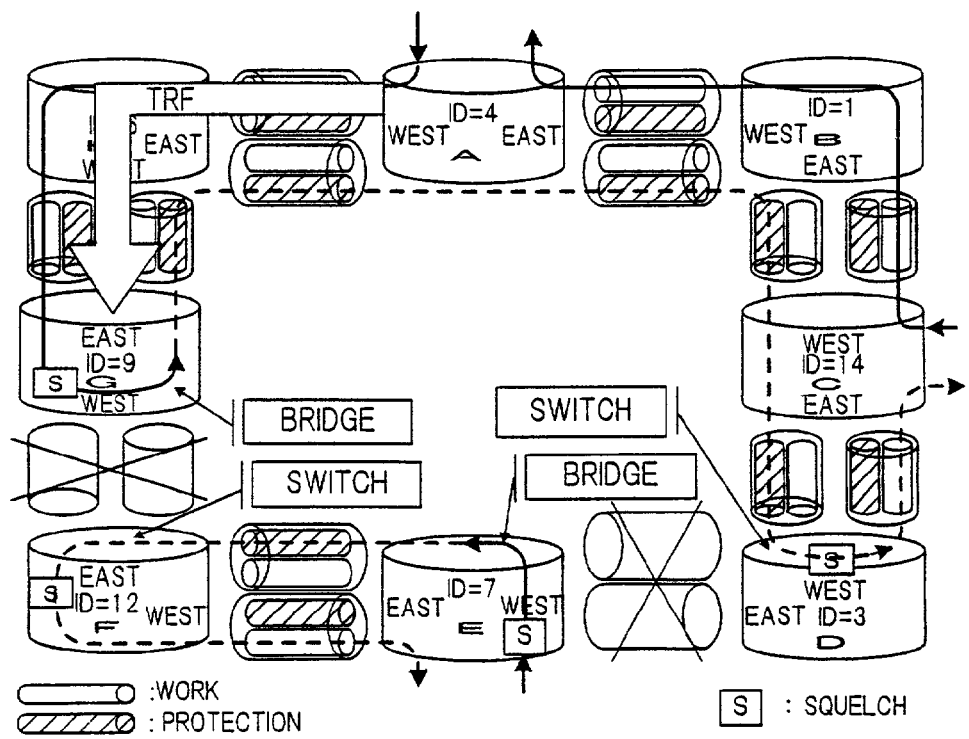

With the BLSR scheme according to conventional SONET (SHD), as shown in FIG. 36B, the P-AIS is inserted at a loop-back node and the P-AIS is transported downstream (in the direction from which the signal exits from the network) as well to thereby communicate to downstream devices the fact that a failure occurred. In a POS ring transmission system also, it is necessary to send a network-failure notification signal downstream with regard to a connection in the squelched state.

However, when the transmission of an ATM cell is halted at the entrance to the ring in regard to a connection in the squelched state, as in the first embodiment of FIG. 9, the drop node at the ring exit cannot determine whether this is merely a state in which an ATM cell is merely absent or a state in which an ATM cell does not arrive owing to squelch. This means that the occurrence of a failure cannot be identified. In order to solve this problem, connections are set up as an upstream/downstream pair.

Figure 10:
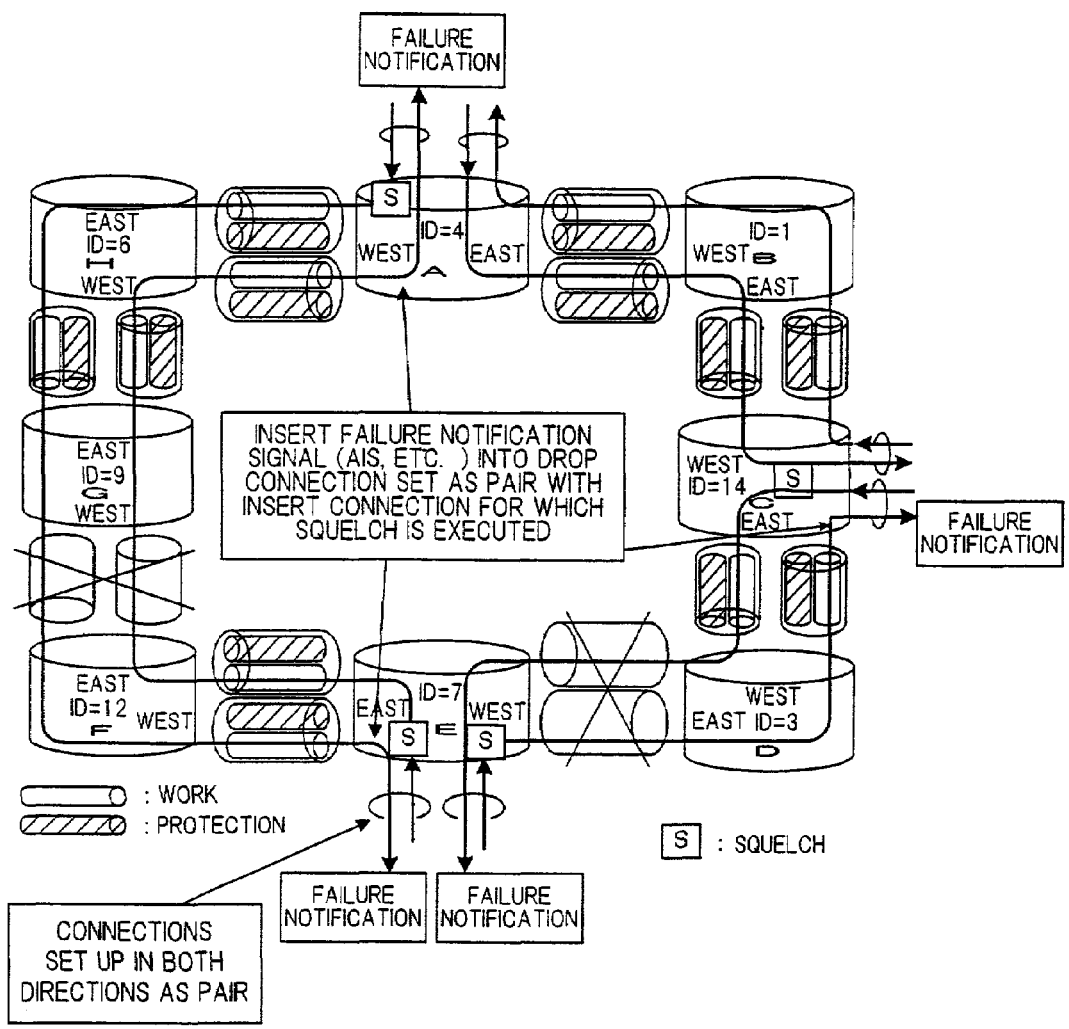
FIG. 10 is a diagram useful in describing a method of reporting failure in the downstream direction.

An ordinary connection setting is always set up as an upstream/downstream connection pair. Therefore, as shown in FIG. 10, the output of data to the ring is halted at an insert node with regard to an upstream connection (in the direction in which a signal is inserted into the ring) judged to require squelch owing to the occurrence of multiple failures, and a failure notification signal such as P-AIS is sent in the downstream direction on the lower-order side at an insert node with regard to a downstream connection (in the direction in which a signal exits from the ring) set as one connection of the pair. As a result, squelch is implemented in the downstream direction.

(c) Processing Flow

Figure 11:
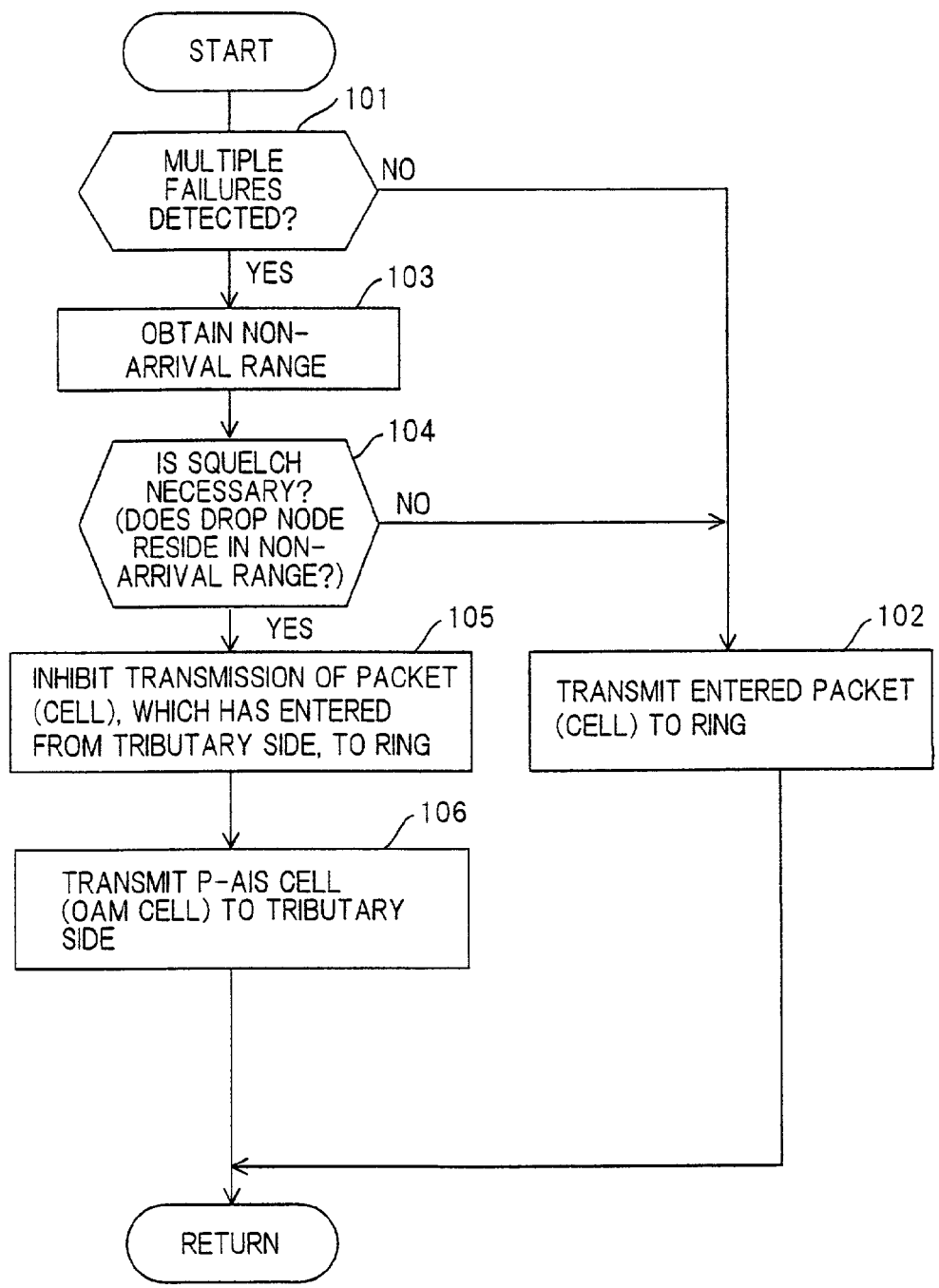
FIG. 11 is a flowchart of squelch execution processing.

FIG. 11 is a flowchart of processing for executing squelch according to the first embodiment.

As shown in FIG. 11, the monitoring controller 54 checks to determine whether failures have occurred at multiple locations in the ring network on the basis of the K1/K2 bytes that enter from the K1/K2 receive processing unit 61 of each of the ring interfaces 15₁, 15₃ connected to the working transmission path (step 101). If failures have not occurred at multiple locations ("NO" at step 101), then the receive-data processing unit 63 converts the VPI/VCI of the input cell to an apparatus CID, adds on a routing tag and inputs the resultant signal to the switch 52 so that the signal is sent to the transmission path via the switch and output-side ring interface (step 102). On the other hand, if it is found from the K1/K2 bytes that failures have occurred at multiple locations in the network, the monitoring controller 54 refers to the internal ring topology to obtain the nodes at which the signal from its own node will not arrive and inputs the non-arrival range data to the receive-data processing unit 71 of the low-speed interface (step 103).

The receive-data processing unit 71 determines whether the node ID of the drop node that drops the ATM cell entering from the tributary side coincides with a node ID included in the non-arrival range data, as described above in conjunction with FIG. 7. That is, the receive-data processing unit 71 determines whether squelch is necessary with regard to a cell that enters from the tributary side (step 104).

If execution of squelch is unnecessary, i.e., if communication is possible because the insert node and drop node are not isolated from each other owing to failure, the processing of step 102 is executed. If execution of squelch is necessary ("YES" at step 104), on the other hand, the receive-data processing unit 71 halts the input of the above-mentioned ATM cell, which entered from the tributary side, to the ATM switch 52 so that the cell will not be sent to the transmission path (step 105).

Further, the receive-data processing unit 71 obtains the apparatus CID corresponding to the VPI/VCI of the above-mentioned cell from the upstream VRT 72 and reports it to the monitoring controller 54. The latter saves the reported apparatus CID and inputs this apparatus CID to the low-speed interface 56 on the output side periodically. Whenever the apparatus CID enters from the monitoring controller 54, the low-speed interface 56 obtains, from the downstream VRT 75, the VPI/VCI corresponding to the apparatus CID for which a pair has been set, creates an OAM cell (P-AIS) of this VPI/VCI and sends the OAM cell to the tributary side to notify terminals downstream on the lower-order side (step 106). The periodic transmission of the OAM cell (P-AIS) at step 106 is performed until recovery from failure is achieved.

(d) Processing for Detecting Multiple Failures

According to the first embodiment, it is necessary that faulty locations be recognized at all nodes in order to implement squelch at an insert node. To accomplish this, intermediate nodes (nodes at which failures have not occurred in the connection paths on both sides) monitor APS bytes (K1/K2 bytes) that flow in both the WE and EW directions, thereby determining where the failures occurred.

Detection of Single Failure at Intermediate Node

Figure 12A:
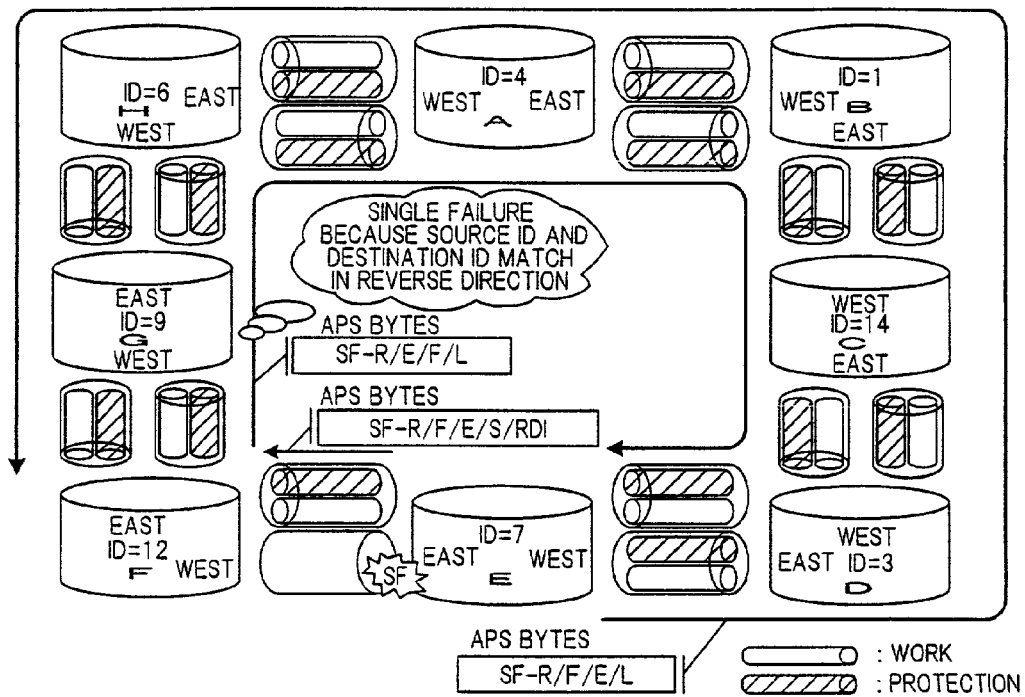
FIGS. 12A and 12B are diagrams useful in describing the principle of failure detection at an intermediate node.

If a failure has occurred between nodes F and E in FIG. 12A, node E uses the APS bytes (K1/K2 bytes) to send node F an SF-R notification along the long path (S/L bit="1") (APS: SF-R/F/E/L) and an SF-R notification along the short path (S/L bit="0"). Further, upon receiving RDI notification from node E by the short path, the node F reports SF-R to node E by the long path (APS: SR-R/E/F/L). Intermediate nodes (A to D, G to F) monitor the APS bytes in both the EW and WE directions and judge that a single failure has occurred if the source ID of one APS byte matches the destination ID of the other APS byte.

Detection of Multiple Failures at Intermediate Nodes

Figure 12B:
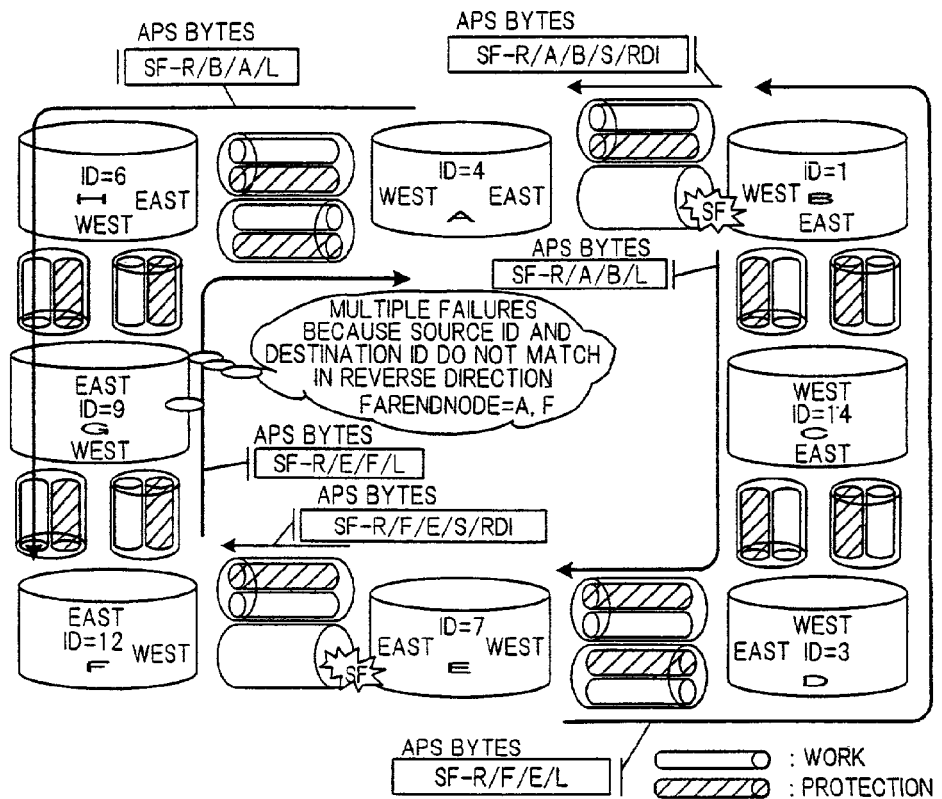

If the occurrence of the signal failure in FIG. 12A is accompanied also by failure between nodes A and B, as shown in FIG. 12B, node B issues an SF-R notification along the long path (SF-R/A/B/L) and an SF-R notification along the short path (SF-R/A/B/S/RDI) using the ABS bytes. Further, upon receiving RDI notification from node B by the short path, the node A reports SF-R to node B by the long path (APS: SF-R/B/A/L). As a result, from the viewpoint of intermediate node G, SF-R/B/A/L is received in the counterclockwise direction and SF-R/E/F/L is received in the clockwise direction. Therefore, since the source ID of one APS byte does not match the destination ID of the other APS byte, the intermediate node G decides that multiple failures have occurred. Further, the nodes at the farthest ends as seen from node G become the source IDs (nodes A and F) of the received APS bytes. Any node beyond these farthest-end nodes is judged to lie in a range within which a signal will not arrive from node G.

Detection of Single/Multiple Failure at Nodes Adjacent Failure

The foregoing relates to a case where single/multiple failure is detected at an intermediate node. Described next will be detection of a single/multiple failure at nodes where failure has occurred in one connected transmission path (such a node shall be referred to as a "failure-adjacent node"). With reference to the single failure of FIG. 12A, the failure-adjacent nodes E and F both receive self-addressed SF-R notification along the long path (S/L byte="1") by the APS bytes. With reference to the multiple failures of FIG. 12B, the failure-adjacent nodes E and F both receive SF-R notification, which is not self-addressed, via the long path by the APS bytes. Accordingly, single/multiple failure is detected depending upon whether SF-R notification on the long path is self-addressed or not.

Figure 15:
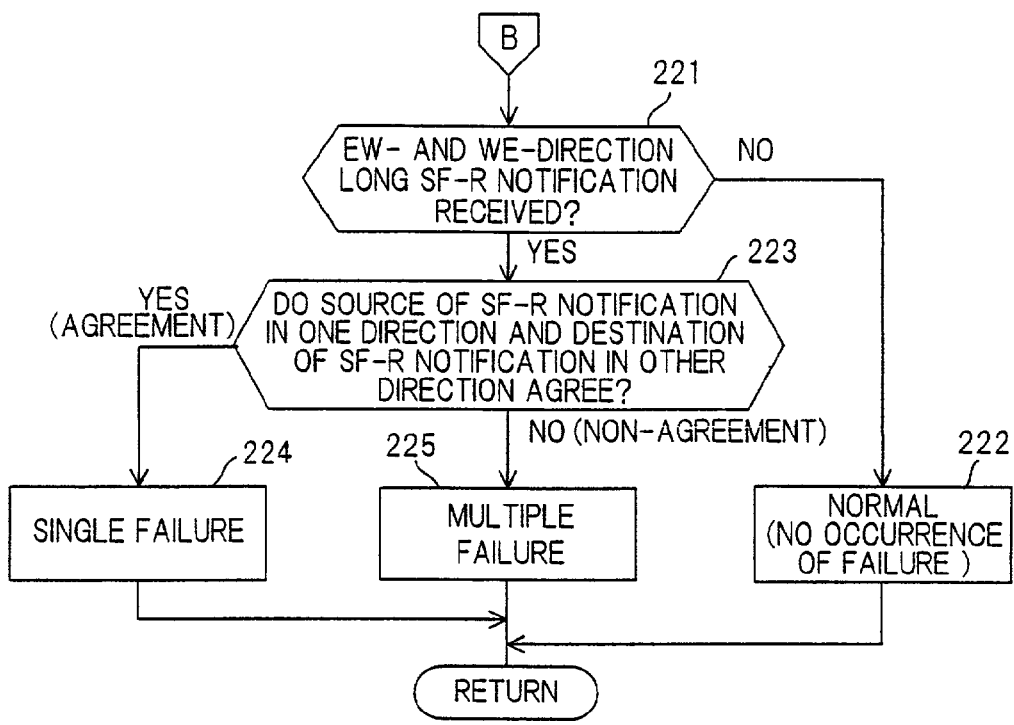
FIG. 15 is a flowchart (part 3) of processing for detecting occurrence of multiple failures.

FIGS. 13 to 15 are flowcharts of processing for detecting occurrence of multiple failures.

The monitoring controller 54 of the node of interest determines whether a transmission-path failure has occurred (step 201). If occurrence of failure is detected ("YES" at step 201), SF-R of the short and long paths is transmitted toward the nodes neighboring the failure point on both sides thereof (step 202). Next, when the monitoring controller 54 of the node of interest receives the SF-R notification from the other node (step 203), the monitoring controller 54 determines whether this SF-R notification is an SF-R notification addressed to its own node (step 204). If the address is not that of its own node ("NO" at step 204), then the monitoring controller 54 judges that multiple failures have occurred (step 205). If the address is that of its own node ("YES" at step 204), then the monitoring controller 54 determines whether the notification is SF-R notification of the long path or short path (step 206). If the decision is long path (S/L="1") ("YES" at step 206), then the monitoring controller 54 judges that a single failure has occurred (step 207). If the decision is short path (S/L="0") ("NO" at step 206), then the monitoring controller 54 judges that isolation failures have occurred, namely failures in the transmission paths on both sides (step 208).

If a failure is not detected at step 201, the monitoring controller 54 checks to see whether an SF-R notification along the short path has been received (step 211). If an SF-R notification along the short path has been received ("YES" at step 211), the monitoring controller 54 transmits SF-R of the long path to the short-path SF-R source (step 212). Next, if SF-R is received from the other node (step 213), the monitoring controller 54 checks to see whether this SF-R notification is addressed to its own node (step 214). If the address is not that of its own node ("NO" at step 204), then the monitoring controller 54 judges that multiple failures have occurred (step 215). If the address is that of its own node ("YES" at step 214), then the monitoring controller 54 determines whether the notification is SF-R notification of the long path or short path (step 216). If the decision is long path ("YES" at step 216), then the monitoring controller 54 judges that a single failure has occurred (step 217). If the decision is short path ("NO" at step 216), then the monitoring controller 54 judges that isolation failures have occurred, namely failures in the transmission paths on both sides (step 218).

If an SF-R notification along the short path is received at step 211, the monitoring controller 54 determines whether the long-path SF-R notification has been received in the EW and WE directions (step 221). If it has not been received, ("NO" at step 221), the monitoring controller 54 judges that a failure has not occurred (step 222). However, if the long-path SF-R notification in the EW and WE directions has been received, then the monitoring controller 54 determines whether the insert node of one SF-R notification agrees with the drop node of the other SF-R notification (step 223). If the two agree ("YES" at step 223), then the monitoring controller 54 judges that a single failure has occurred (step 224). If the two do not agree ("NO" at step 223), then the monitoring controller 54 judges that multiple failures have occurred (step 225).

By way of example, node E in FIG. 12B detects the occurrence of multiple failures by the above-described steps 201 to 208, node F detects the occurrence of multiple failures by the above-described steps 211 to 218, and intermediate nodes G, H detect occurrence of failure by steps 221 to 225.

(C) Second Embodiment of Squelch Execution

Figure 16:
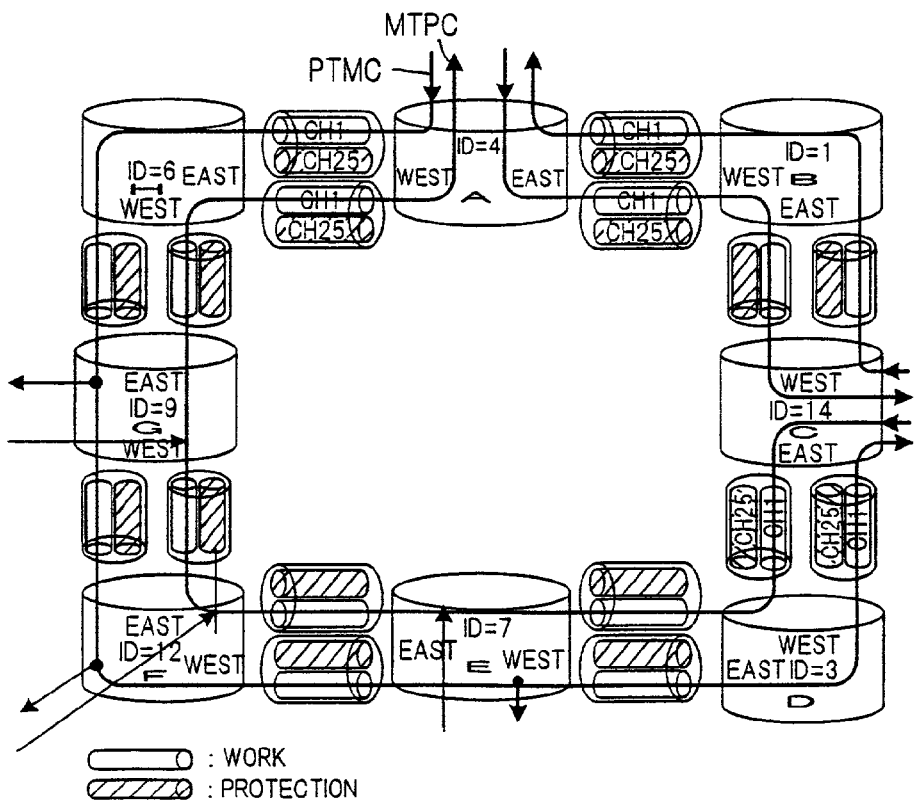
FIG. 16 is a diagram useful in describing a multipoint connection.

A point-to-multipoint connection is a form of communication in which the same packet is transmitted from one node A to multiple nodes G, F, E, C simultaneously, as indicated by the communication path PTMC in FIG. 16. Bandwidth is utilized effectively because it is unnecessary to establish a connection for every destination. Further, a multipoint-to-point connection is a form of communication in which packets are transmitted from multiple nodes to one node using the same connection ID, as indicated by the communication path MTPC in FIG. 16. This is advantageous in that connection IDs can be reduced.

(a) Point-to-multipoint Connection

When the Same Connection ID is Used over Different Spans

Figure 17:
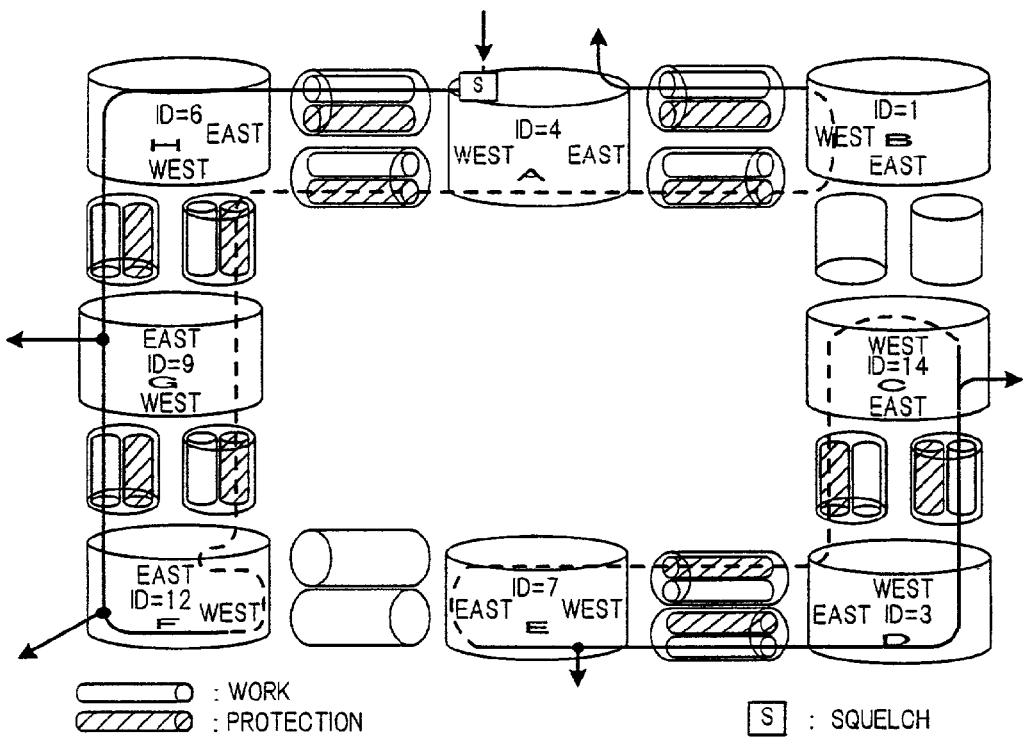
FIG. 17 is a diagram useful in describing a point-to-multipoint connection (reutilization of connection ID)

If a point-to-multipoint connection has been set up in ring transmission based upon POS (Packet Over Sonet) and the same connection (VPI/VCI in case of an ATM cell and an IP address in case of an IP packet) is used over different spans, there is the possibility that a misconnection will occur owing to multiple failures unless squelch is carried out. In FIG. 17, for example, a packet that has been looped back at node F is looped back at node B, merges with another connection having the same connection ID and a misconnection occurs. When such multiple failures occur, squelch processing is executed in conventional SONET by inserting P-AIS at the node F where loop-back is carried out. However, if squelch is executed at the loop-back node in similar fashion in ring network based upon POS, needless traffic flows within the ring.

Accordingly, in the present invention, it is so arranged that a needless packet will not flow through the ring. This is accomplished by having an insert node that inserts a packet into the ring perform squelch processing for a point-to-multipoint connection. The result is that bandwidth in the ring is utilized effectively. More specifically, when multiple failures occur, the insert node of a point-to-multipoint connection for which squelch has been deemed necessary executes squelch by performing an operation that halts output of a packet to the ring. In the example of FIG. 17, squelch is executed at the insert node A.

A specific method of squelch execution in a case where the same connection ID is used over different spans in a point-to-multipoint connection is to set a node ID of the drop node at the farthest end from the insert node as squelch-table information of the upstream VRT 72 in FIG. 5. In the example of the point-to-multipoint connection of FIG. 16, the node ID of the farthest-end drop node C is set in the squelch-table information column of the upstream VRT 72 of insert node A. As a result of this arrangement, the insert node A will halt the transmission of a multicast packet to the transmission path (i.e., will implement squelch) if a failure occurs between the insert node A and the farthest drop node C and another failure occurs at any location. As a result, in a point-to-multipoint drop connection, it is no longer necessary to set squelch separately for each of the number of drops.

When the Same Connection ID is Not Used over Different Spans

If the same connection ID is not used over different spans in ring transmission based upon POS (Packet Over Sonet), there is no possibility of misconnection. For example, in FIG. 18, a packet that has been looped back at node F is not looped back at node B and, hence, a misconnection does not occur. In other words, when multiple failures occur, squelch is unnecessary in a case where the insert node A and both drop nodes G, F of a point-to-multipoint connection exist in a severed ring.

Accordingly, in the present invention, if the same connection ID is not used over different spans in a point-to-multipoint connection, it is judged that a failure is unrescuable and the insert node A halts (squelches) transmission of a multicast packet to the transmission path when the nearest drop node (nearest-end drop node) to an insert node in the direction of packet transmission resides in a signal non-arrival range. More specifically, a node ID of the drop node nearest to the insert node is set as squelch-table information of the upstream VRT 72 in FIG. 5. As a result of this arrangement, the insert node A will halt the transmission of a multicast packet (i.e., will implement squelch) to the transmission path only when a failure occurs between the insert node A and the nearest-end drop node G and another failure occurs at any location to render communication impossible.

Figure 18:
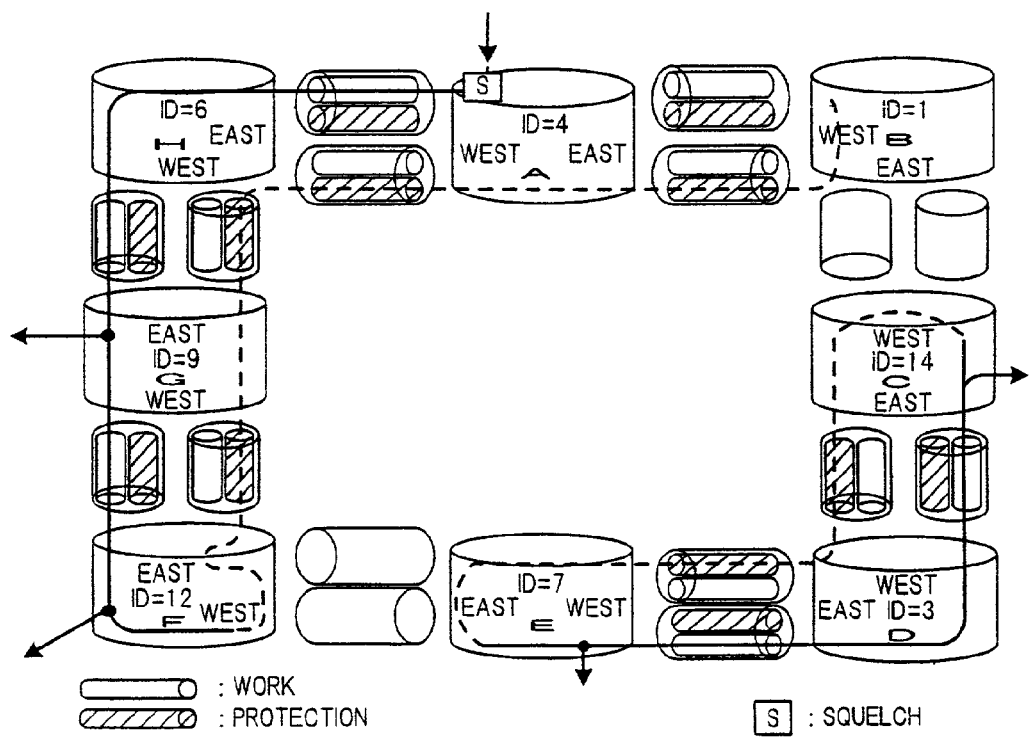
FIG. 18 is a diagram useful in describing a point-to-multipoint connection (no reutilization of connection ID)

Thus, an insert node is capable of continuing communication with a drop node that resides between the insert node and the point of failure. As a result, the connection across nodes A, G and F is maintained, as shown in FIG. 18, without executing squelch even when failures occur between nodes B and C and between nodes E and F. Using this scheme makes it unnecessary to set squelch separately for each of the number of drops in point-to-multipoint drop connection.

Flow of Processing for Executing Point-to-multipoint Squelch

Figure 19:
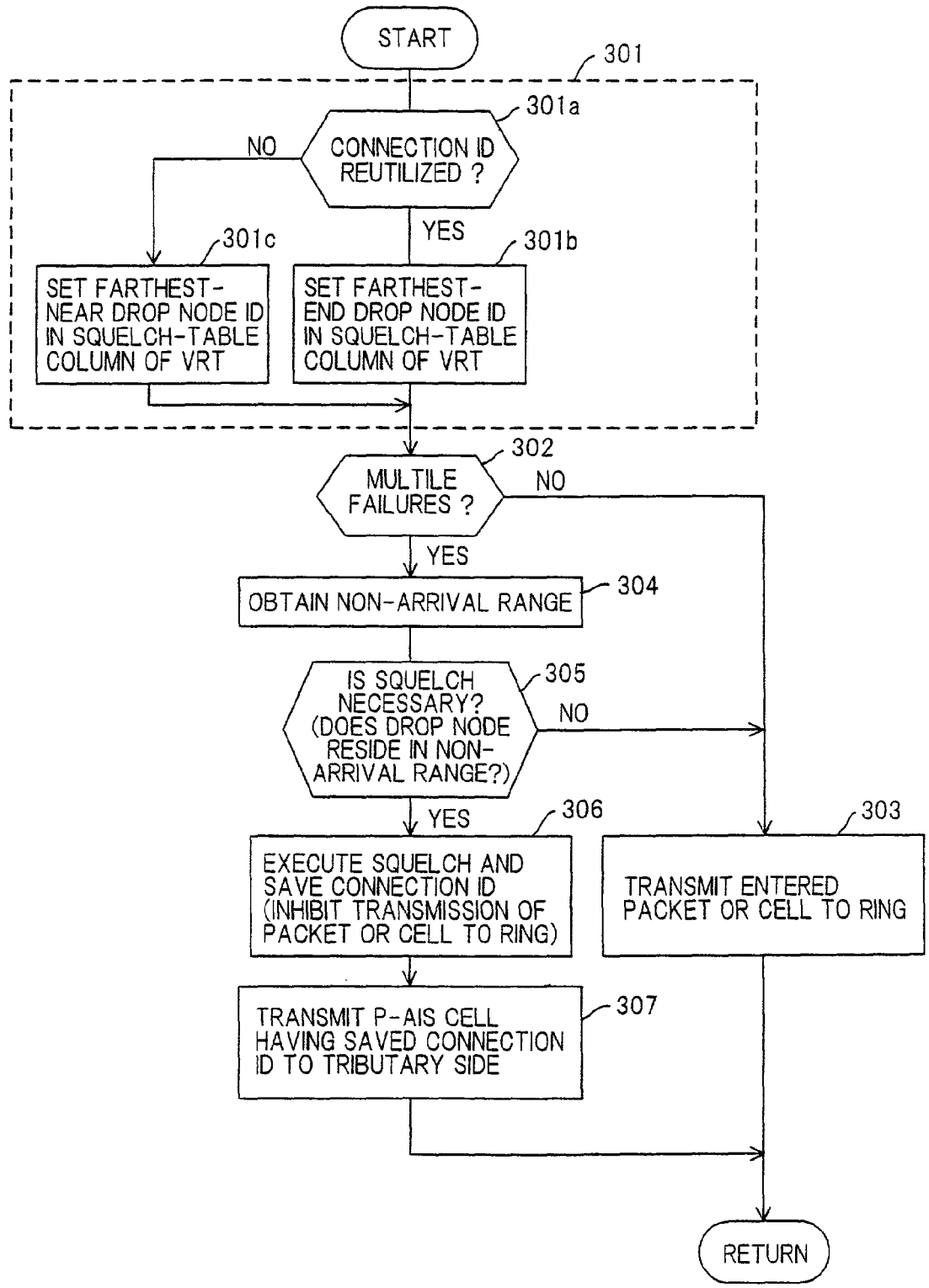
FIG. 19 is a flowchart illustrating processing for executing squelch in a point-to-multipoint connection.

FIG. 19 illustrates the flow of processing for executing point-to-multipoint squelch.

The drop node ID of a multicast packet is set in the squelch-table information column of the upstream VRT 72 of an insert node (step 301). More specifically, it is determined whether use of the same connection ID is allowed in different spans of the ring network (step 301a). If use of the same connection ID is allowed in different spans ("YES" at step 301a), the farthest-end drop node ID of the point-to-multipoint connection is set in the squelch-table information column of the upstream VRT 72 (step 301b). However, if use of the same connection ID is not allowed in different spans ("NO" at step 301a), the nearest-end drop node ID of the point-to-multipoint connection is set in the squelch-table information column of the upstream VRT 72 (step 301c).

Under these conditions, the monitoring controller 54 checks to see whether failures have occurred at a plurality of locations in the ring network based upon the K1/K2 bytes that enter from the K1/K2 receive processing units 61 of the ring interfaces $51_1$, $51_3$ (step 302). If failures have not occurred at multiple locations, the receive-data processing unit 63 converts the VPI/VCI of the input cell to an apparatus CID, adds on a routing tag and sends the resultant signal to the switch 52 so that the signal is sent to the transmission path via the switch and output-side ring interface (step 303). On the other hand, if it is found from the K1/K2 bytes that failures have occurred at multiple locations in the network, the monitoring controller 54 refers to the internal ring topology to obtain the nodes at which the signal from its own node will not arrive and inputs the non-arrival range data to the receive-data processing unit 71 of the low-speed interface (step 304). As described above in conjunction with FIG. 7, the receive-data processing unit 71 determines whether the drop node ID (obtained from the upstream VRT 72) corresponding to the VPI/VCI of the cell that enters from the tributary side coincides with a node ID included in the non-arrival range data. For example, if the cell that enters from the tributary side is a multicast cell, the receive-data processing unit 71 check to see whether squelch is necessary by determining whether the drop node ID corresponding to the VPI/VCI of this multicast cell matches a node ID included in the non-arrival range data (step 305).

If execution of squelch is unnecessary, i.e., if communication is possible because the insert node and nearest-end drop node or farthest-end drop node of the point-to-multipoint connection are not isolated from each other owing to failure, the processing of step 303 is executed. If execution of squelch is necessary ("YES" at step 305), on the other hand, the receive-data processing unit 71 halts the input of the multicast cell, which entered from the tributary side, to the ATM switch 52 so that the cell will not be sent to the transmission path (step 306).

Further, the receive-data processing unit 71 obtains the apparatus CID corresponding to the VPI/VCI of the above-mentioned multicast cell from the upstream VRT 72 and reports it to the monitoring controller 54. The latter saves the reported apparatus CID and inputs this apparatus CID to the low-speed interface 56 on the output side periodically. Whenever the apparatus CID enters, the low-speed interface 56 obtains, from the downstream VRT 75, the VPI/VCI corresponding to the apparatus CID for which a pair has been set, creates an OAM cell (P-AIS) of this VPI/VCI and sends the OAM cell to the tributary side to notify terminals downstream (step 307). The periodic transmission of the OAM cell (P-AIS) at step 307 is performed until recovery from failure is achieved.

(b) Multipoint-to-point Connection

When the Same Connection ID is Used over Different Spans

Figure 20:
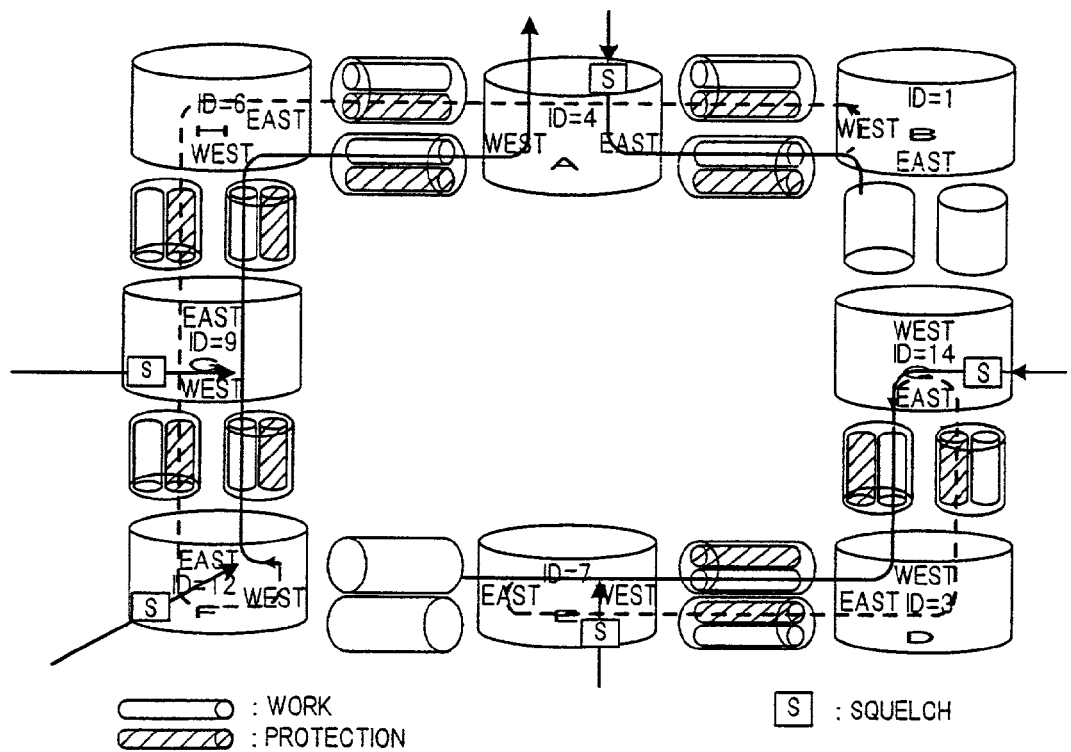
FIG. 20 is a diagram useful in describing a multipoint-to-point connection (reutilization of connection ID)

If a multipoint-to-point connection has been set up in ring transmission based upon POS and the same connection is used over different spans, there is the possibility that a misconnection will occur owing to multiple failures. In FIG. 20, a packet that has been looped back at node B is looped back at node F and merges with another connection to bring about a misconnection. When such multiple failures occur, squelch processing is executed in conventional SONET by inserting P-AIS at the node where loop-back is carried out. However, if squelch is executed at the loop-back node in similar fashion in ring network based upon POS, needless traffic flows within the ring.

Accordingly, in the present invention, squelch processing for a multipoint-to-point connection is executed at each insert node that inserts a packet into the ring. The result is that bandwidth in the ring is utilized effectively. More specifically, when multiple failures occur, each insert node of a multipoint-to-point connection for which squelch has been deemed necessary executes squelch by performing an operation that halts output of a packet to the ring. In the example of FIG. 20, squelch is executed at the nodes F, G, nodes C, E and node A.

When the Same Connection ID is Not Used over Different Spans

Figure 21:
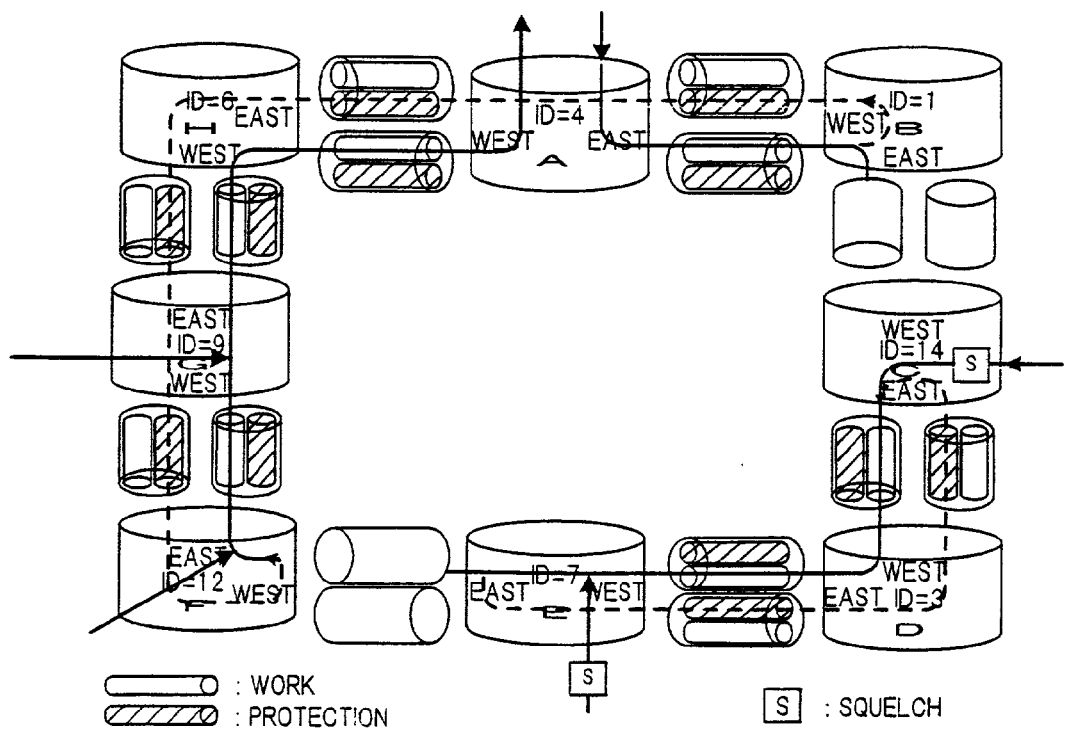
FIG. 21 is a diagram useful in describing a multipoint-to-point connection (no reutilization of connection ID)

If the same connection ID is not used over different spans in ring transmission based upon POS (Packet Over Sonet), there is no possibility of misconnection. For example, in FIG. 21, a packet that has been looped back at node B is not looped back at node F and, hence, a misconnection does not occur. In other words, when multiple failures occur, squelch is unnecessary in a case where an insert node and both drop nodes exist in a multipoint-to-point connection of a severed ring. However, if the insert node is cut off from drop nodes in regard to a multipoint-to-point connection at the time of multiple failures (nodes D, E in FIG. 21), output of a packet to the ring is halted (squelch is executed) at insert nodes D, E to utilize the band in the ring effectively.

Accordingly, in the present invention, if the same connection ID is not used over different spans in a multipoint-to-point connection, a drop node ID is set as squelch-table information of the upstream VRT 72 of each insert node. If this arrangement is adopted, squelch is executed in regard to an insert node isolated from a drop node owing to multiple failures, and squelch is not executed in regard to an insert node not cut off from a drop node. If failures occur between nodes B and C and between nodes E and F in FIG. 21, insert nodes C, E execute squelch but insert nodes F, G do not execute squelch and the connection is maintained.

Pair Setting

It is required that a connection for which squelch has been executed in regard to a multipoint connection send a failure notification signal such as P-AIS downstream (in the direction in which a signal exits from the ring). In a case where data is halted at the entrance to a ring, however, a drop node at the exit of the ring cannot accept notification of failure. In order to solve this problem, point-to-multipoint drop connections are set up in a pair with respect to a multipoint-to-point insert connection. With regard to a connection judged to require squelch owing at the occurrence of multiple failures, output of a packet to the upstream connection (in the direction in which a packet is inserted into the ring) is halted and a failure notification signal such as P-AIS is sent to the downstream connection (in the direction in which a signal exits from the ring) set as one connection of the pair.

Flow of Processing for Executing Multipoint-to-point Squelch

Figure 22:
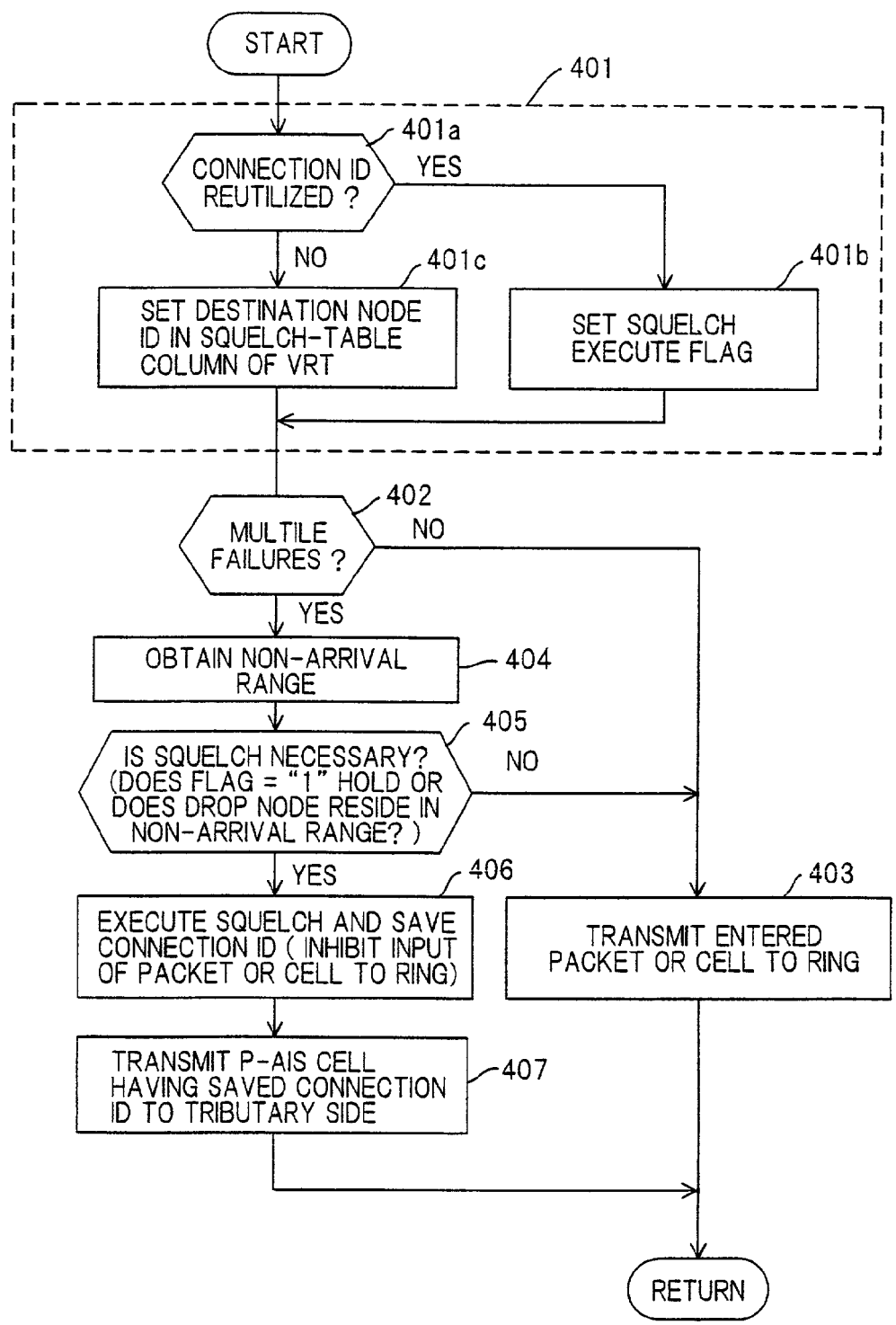
FIG. 22 is a flowchart illustrating processing for executing squelch in a multipoint-to-point connection.
Figure 23A:
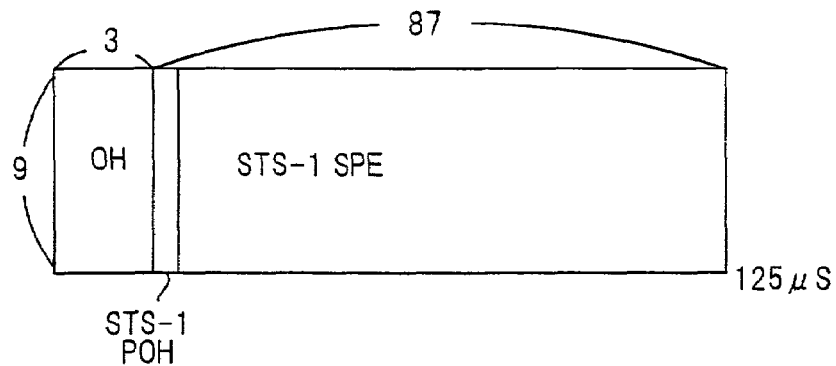
FIGS. 23A to 23C are diagrams useful in describing an STS-1 frame format.
Figure 23B:
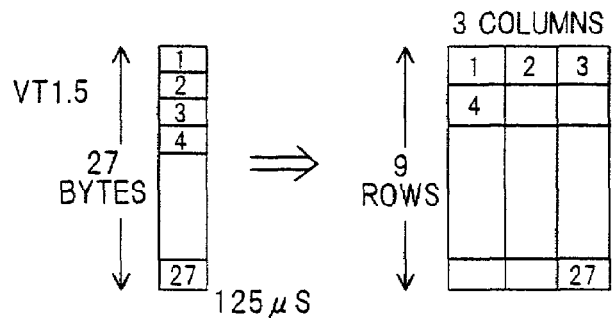
Figure 23C:
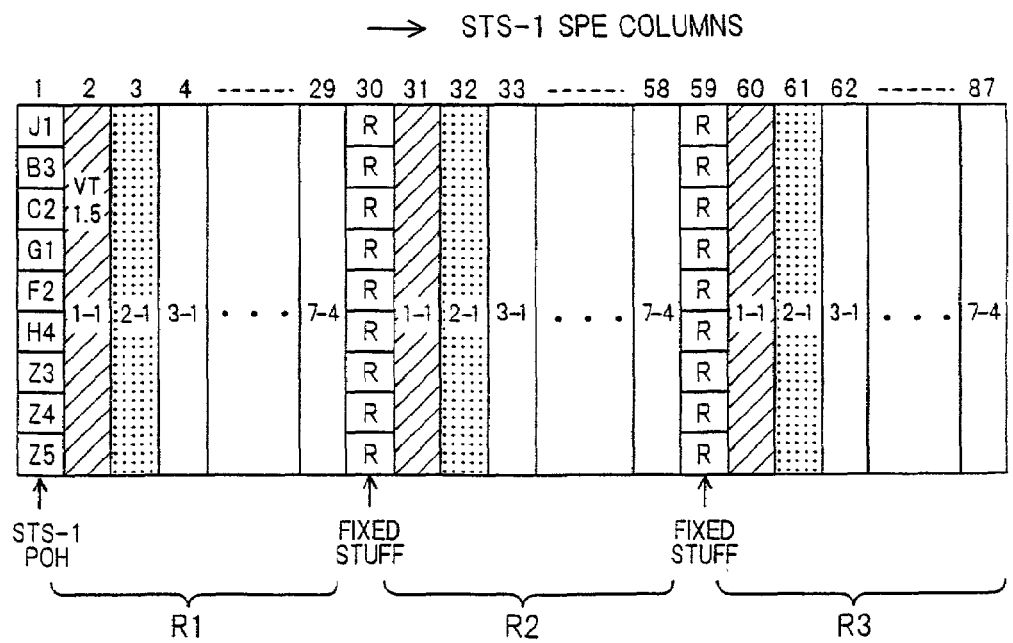
Figure 24:
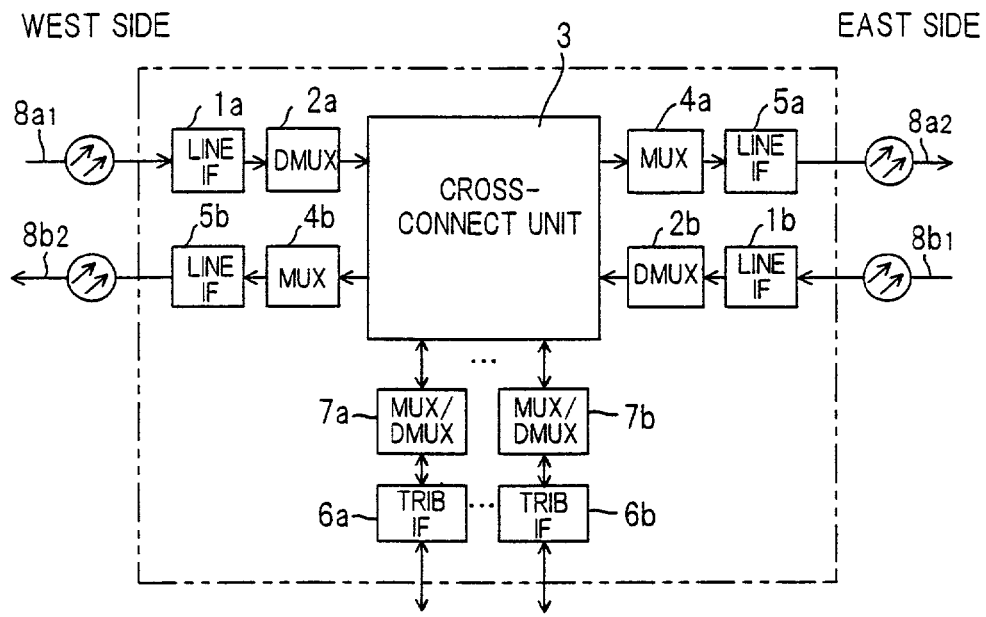
FIG. 24 is a simplified block diagram of an ADM transmitting apparatus according to the prior art.
Figure 25:
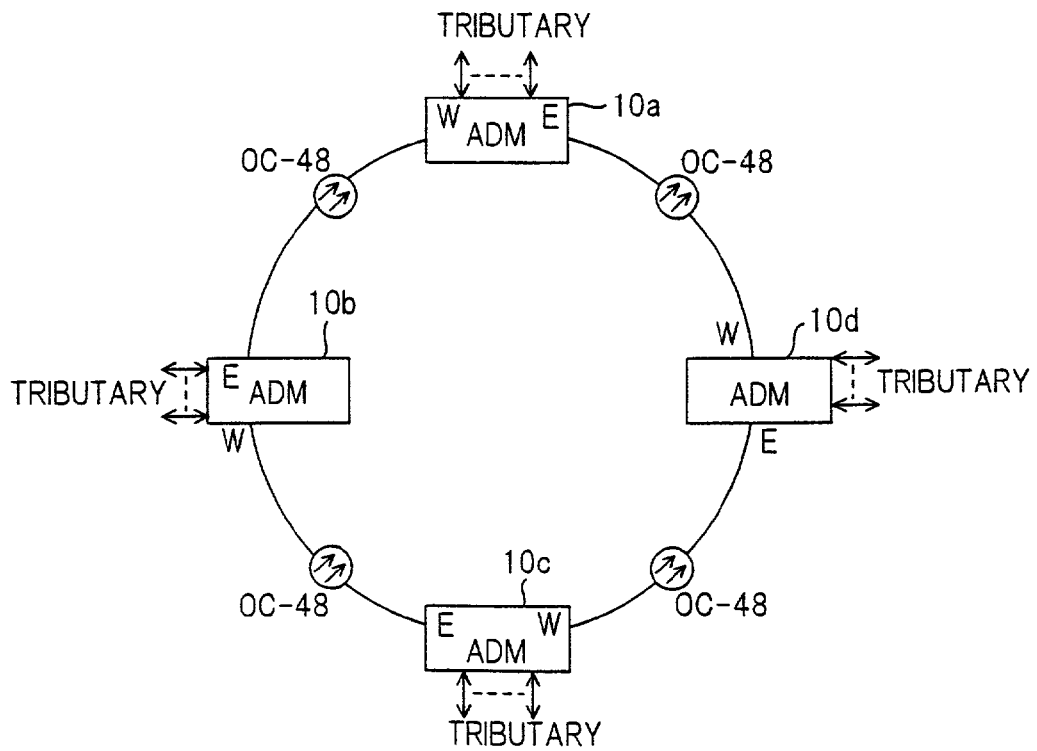
FIG. 25 is a diagram showing a ring structure according to the prior art.
Figure 26A:
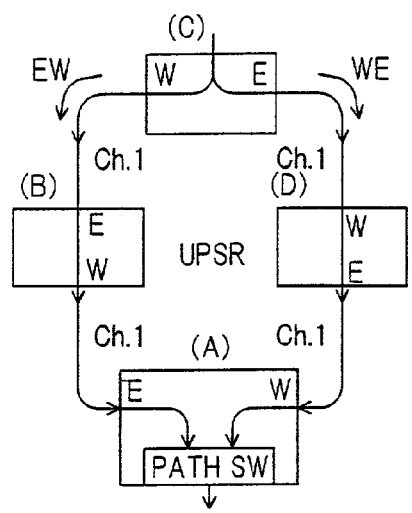
FIGS. 26A to 26D are diagrams useful in describing rescue in the event of a failure according to the prior art.
Figure 26B:
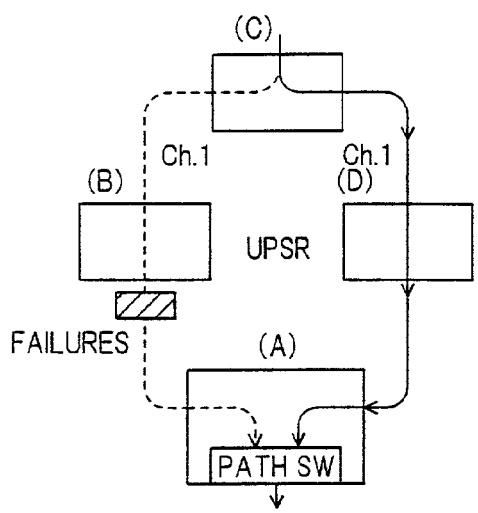
Figure 26C:
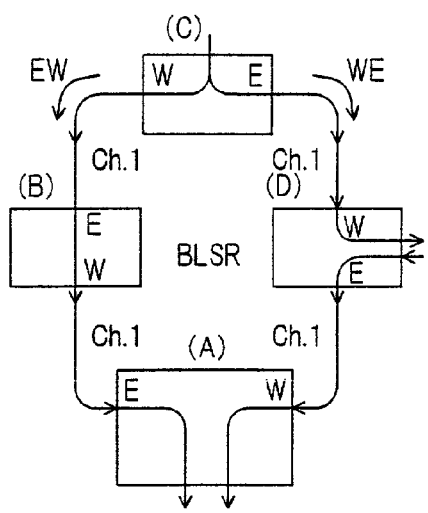
Figure 26D:
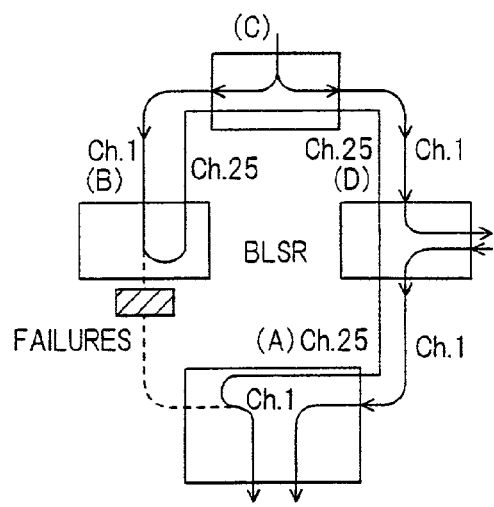
Figure 27:
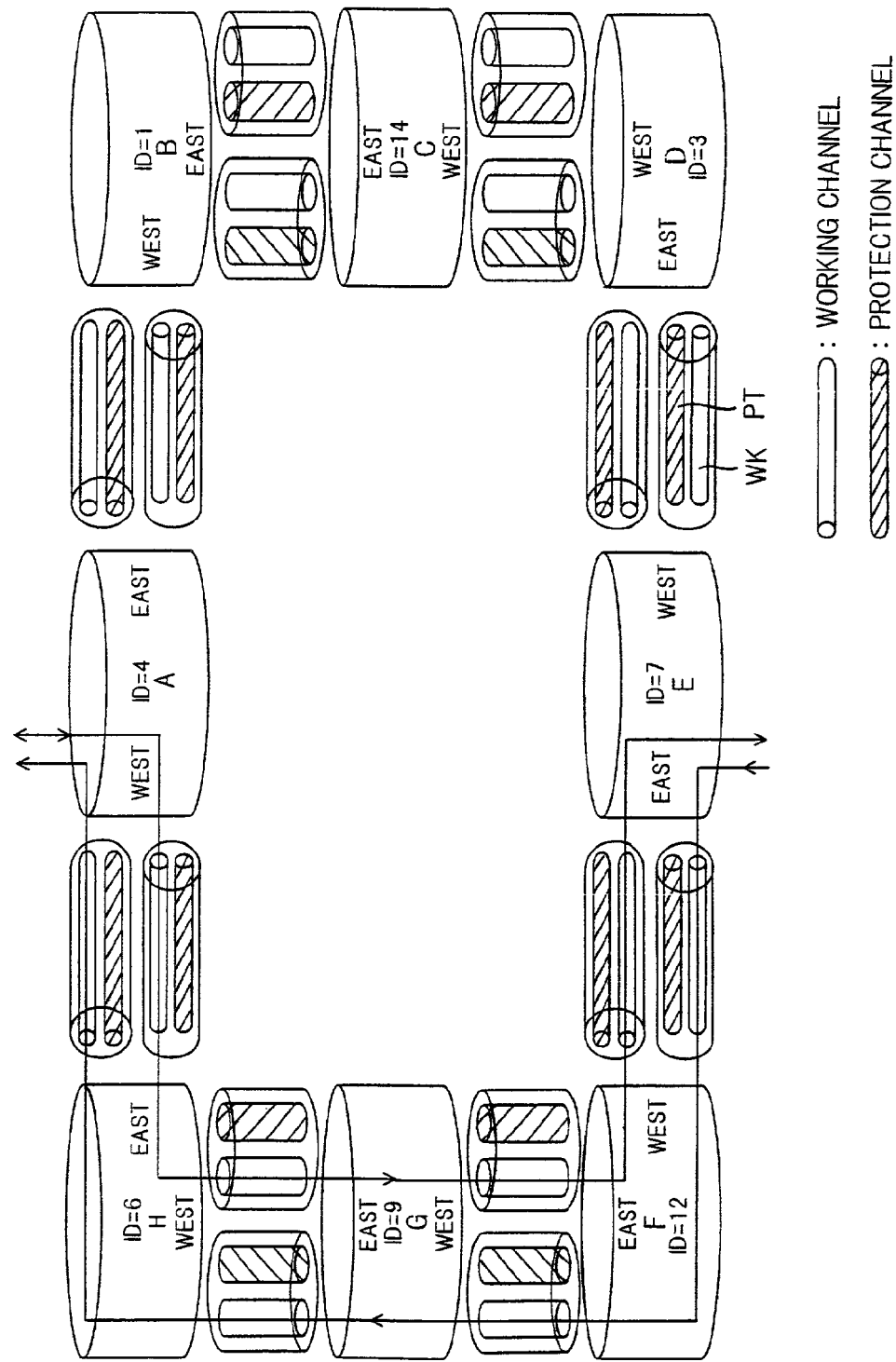
FIG. 27 is a first diagram useful in describing an APS protocol according to the prior art.
Figure 28:
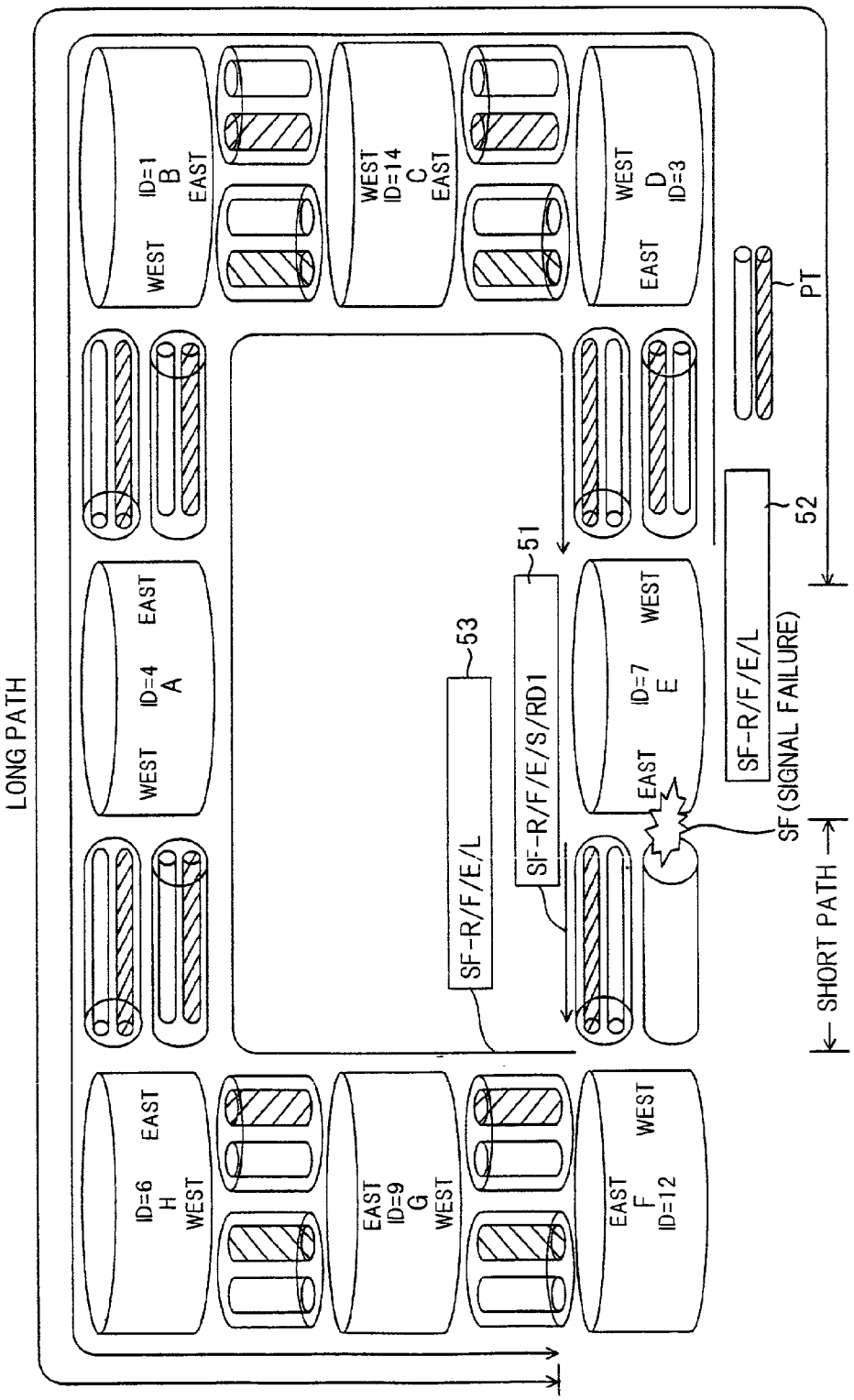
FIG. 28 is a second diagram useful in describing an APS protocol according to the prior art.
Figure 29:
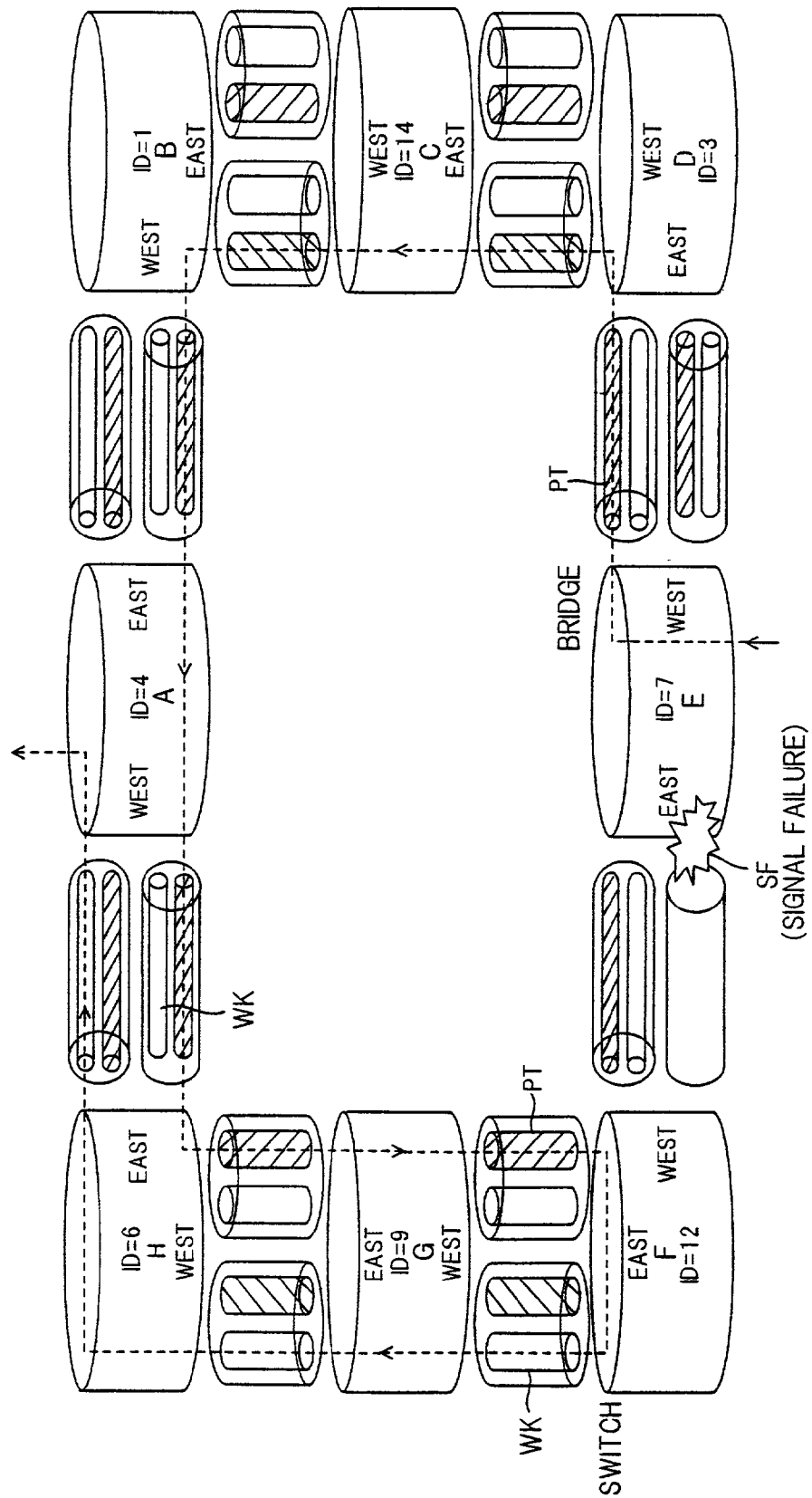
FIG. 29 is a third diagram useful in describing an APS protocol according to the prior art.
Figure 30:
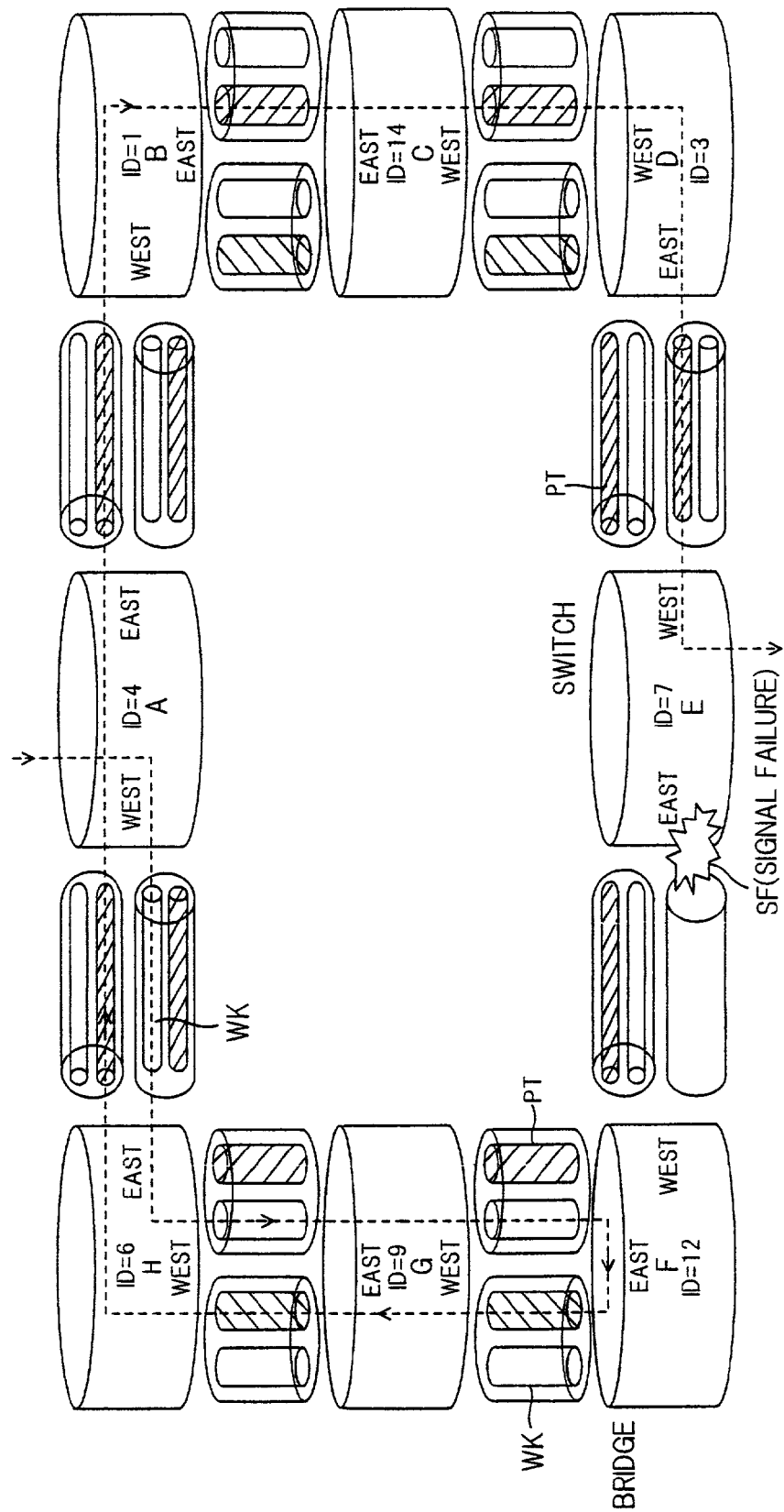
FIG. 30 is a fourth diagram useful in describing an APS protocol according to the prior art.

FIG. 22 illustrates the flow of processing for executing multipoint-to-point squelch.

A drop node ID is set in the squelch-table information column of the upstream VRT 72 of each insert node (step 401) in the multipoint-to-point connection. More specifically, it is determined whether use of the same connection ID is allowed in different spans of the ring network (step 401*a*). If use of the same connection ID is allowed in different spans, a squelch execute flag is set in the squelch-table information column of the upstream VRT 72 conforming to the packet of the multipoint-to-point connection (step 401*b*). As a result, in case of a multipoint-to-point connection, squelch is carried out unconditionally if multiple failures occur. However, if use of the same connection ID is not allowed in different spans, a drop node ID is set in the squelch-table information column of the upstream VRT 72 conforming to the packet of the multipoint-to-point connection (step 401*c*).

Under these conditions, the monitoring controller 54 checks to see whether failures have occurred at a plurality of locations in the ring network based upon the K1/K2 bytes that enter from the K1/K2 receive processing units 61 of the ring interfaces 51$_1$, 51$_3$ (step 402). If failures have not occurred at multiple locations, the receive-data processing unit 63 converts the VPI/VCI of the input cell to an apparatus CID, adds on a routing tag and sends the resultant signal to the switch 52 so that the signal is sent to the transmission path via the switch and output-side ring interface (step 403).

On the other hand, if it is found from the K1/K2 bytes that failures have occurred at multiple locations in the network, the monitoring controller 54 refers to the internal ring topology to obtain the nodes at which the signal from its own node will not arrive and inputs the non-arrival range data to the receive-data processing unit 71 of the low-speed interface (step 404). The receive-data processing unit 71 reads, from the upstream VRT 72, the squelch-table information corresponding to the VPI/VCI of the cell that enters from the tributary side and checks to see whether this squelch-table information is the squelch execute flag. If the information is a drop node ID and not the squelch execution flag, then, as described above in conjunction with FIG. 7, the receive-data processing unit 71 determines whether the drop node ID coincides with a node ID included in the non-arrival range data. If the squelch-table information is a drop node ID and not the squelch execution flag and the drop node ID is not included in the non-arrival range data, then the receive-data processing unit 71 executes the processing of step S403. That is, if communication is possible because the insert node and drop node of the multipoint-to-point connection are not isolated from each other owing to failure, the processing of step 403 is executed.

On the other hand, (1) if the squelch-table information is the squelch execute flag or (2) if the squelch-table information is a drop node ID and not the squelch execute flag and this drop node ID is included in the non-arrival range data, it is necessary to execute squelch and the receive-data processing unit 71 halts the input of the multicast cell, which entered from the tributary side, to the ATM switch 52 so that the cell will not be sent to the transmission path (step 406). Further, the receive-data processing unit 71 obtains the apparatus CID corresponding to the VPI/VCI of the above-mentioned cell from the upstream VRT and reports it to the monitoring controller 54. The latter saves the reported apparatus CID and inputs this apparatus CID to the low-speed interface 56 on the output side periodically. Whenever the apparatus CID enters, the low-speed interface 56 obtains, from the downstream VRT 75, the VPI/VCI corresponding to the apparatus CID for which a pair has been set, creates an OAM cell (P-AIS) of this VPI/VCI and sends the OAM cell to the tributary side to notify terminals downstream (step 407). The periodic transmission of the OAM cell (P-AIS) at step 407 is performed until recovery from failure is achieved.

The foregoing has been described with regard to a case where ATM cells mainly are used as the packets. However, it goes without saying that the present invention is applicable to a transmitting apparatus that uses IP packets or other packets.

Thus, in accordance with the present invention, transmission of a packet to a ring network is halted if communication of the packet becomes impossible because failure of a transmission path has isolated an insert node and a drop node from each other. As a result, needless traffic (packets) will not flow through the ring network and bandwidth is not wasted when squelch is executed. This makes it possible to exploit bandwidth effectively.

Further, in accordance with the present invention, an upstream connection and a downstream connection are set up as a pair. When the upstream connection becomes unrescuable owing to transmission-path failure and squelch is executed, the occurrence of the unrescuable failure is reported to a packet transmit terminal on the lower-order side via the downstream connection of the pair. As a result, a packet transmit terminal on the lower-order side subsequently is capable of halting transmission of a packet.

Further, in accordance with the present invention, a table for converting packet connection IDs to in-apparatus IDs is adapted to retain in-apparatus IDs and packet drop-node IDs in association with the connection IDs. As a result, means provided in an insert node for detecting that failure is unrescuable can readily obtain, from the table, the drop node of a packet that enters from the lower-order side at the occurrence of failures at multiple locations. As a result, the drop node checks whether a signal resides in a signal non-arrival range and can readily recognize whether a failure is unrescuable or not. In addition, a decision to execute squelch can be made by hardware implementation and it is possible to speed up processing without burdening the software.

Further, in accordance with the present invention, it is possible to execute squelch in a point-to-multipoint drop connection which transmits the same packet from one insert node to a plurality of drop nodes.

Further, in accordance with the present invention, it is possible to execute squelch in a multipoint-to-point insert connection which transmits packets from a plurality of insert nodes to one drop node using the same connection ID.

Further, in accordance with the present invention, a multipoint-to-point insert connection and a point-to-multipoint drop connection are set as a pair. When a certain insert connection becomes unrescuable owing to transmission-path failure and squelch is executed, occurrence of the unrescuable failure is reported to a packet transmit terminal on the downstream side via the drop connection of the pair. As a result, the packet transmit terminal on the lower-order side is capable of subsequently halting transmission of a packet.

As many apparently widely different embodiments of the present invention can be made without departing from the spirit and scope thereof, it is to be understood that the invention is not limited to the specific embodiments thereof except as defined in the appended claims.

What is claimed is:

1. A transmitting apparatus in a ring network in which a plurality of transmitting apparatuses are connected in ring form so as to be capable of transmitting in each of upstream and downstream directions, working and protection channels are assigned to each direction and, when failure occurs in a transmission path, a transmit signal is looped back using the protection channel to effect rescue, said apparatus comprising:

rescue-impossible detection means for detecting that communication between an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side, cannot be rescued because of transmission-path failure;

packet-transmission halting means for halting transmission of the packet to the transmission path when communication has become unrescuable; and failure-occurrence detection means for detecting that multiple failures have occurred at multiple locations in a transmission path and obtaining a signal non-arrival range within which a signal does not arrive because of the multiple failures at the multiple locations;

said rescue-impossible detection means of the insert transmitting apparatus determining that rescue is impossible when the drop transmitting apparatus resides in the signal non-arrival range.

2. The apparatus according to claim 1, further comprising failure reporting means, wherein when an upstream connection and a downstream connection are set as a pair and the upstream connection becomes unrescuable, said failure reporting means sends a failure notification packet to a packet transmitting source on the lower-order side via the downstream connection of the pair.

3. The apparatus according to claim 1, wherein a first transmitting apparatus that has detected failure in a transmission path in one direction of upstream and downstream directions transmits, in the one direction, a first packet (long packet), which reports occurrence of the failure, to a second transmitting apparatus between which and the first transmitting apparatus a failure point is sandwiched, and transmits, in the other direction, a second packet (short packet), which reports occurrence of the failure, to the second transmitting apparatus; the second transmitting apparatus, which has received the first packet, transmits, in said other direction, a third packet (long packet), which reports occurrence of the failure, to the first transmitting apparatus; and said failure-occurrence detection means of the insert transmitting apparatus detects occurrence of multiple failures based upon destination of each long packet that has been transmitted from another transmitting apparatus.

4. The apparatus according to claim 1, further comprising a table for retaining apparatus IDs of packet-drop transmitting apparatus in association with packet connection IDs;

said rescue-impossible detection means of the insert transmitting apparatus obtaining, from said table in response to occurrence of multiple failures, a drop transmitting apparatus of a packet that enters from the lower-order side, and deciding that rescue has become impossible when said drop transmitting apparatus resides in the signal non-arrival range.

5. The apparatus according to claim 4, wherein the apparatus ID of a drop transmitting apparatus farthest from the insert transmitting apparatus in the direction of packet transmission is retained in said table in a point-to-multipoint drop connection that transmits the same packet from one insert transmitting apparatus to a plurality of drop transmitting apparatuses; and said rescue-impossible detection means of the insert transmitting apparatus obtains, from said table in response to occurrence of multiple failures, a farthest-end drop transmitting apparatus of a packet, and decides that rescue has become impossible when said drop transmitting apparatus resides in the signal non-arrival range.

6. The apparatus according to claim 4, wherein in a case where the same connection ID is not used in different spans of a network in a point-to-multipoint drop connection that transmits the same packet from one insert transmitting apparatus to a plurality of drop transmitting apparatuses, the apparatus ID of a drop transmitting apparatus nearest to the insert transmitting apparatus in the direction of packet transmission is retained in said table; and said rescue-impossible detection means of the insert transmitting apparatus obtains, from said table in response to occurrence of multiple failures, a nearest-end drop transmitting apparatus of a packet, and decides that rescue has become impossible when said drop transmitting apparatus resides in the signal non-arrival range.

7. The apparatus according to claim 4, wherein in a case where the same connection ID is not used in different spans of a network in a multipoint-to-point insert connection that transmits packets from a plurality of insert transmitting apparatuses to one drop transmitting apparatus using the same connection ID, the ID of the drop transmitting apparatus is retained in said table of each insert transmitting apparatus; and when failures occur at multiple locations, said rescue-impossible detection of each insert transmitting apparatus obtains a multipoint-to-point drop transmitting apparatus and decides that rescue has become impossible when this drop transmitting apparatus resides in the signal non-arrival range.

8. A transmitting apparatus in a ring network in which a plurality of transmitting apparatuses are connected in ring form so as to be capable of transmitting in each of upstream and downstream directions, working and protection channels are assigned to each direction and, when failure occurs in a transmission path, a transmit signal is looped back using the protection channel to effect rescue, said apparatus comprising:

rescue-impossible detection means for detecting that communication between an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side, cannot be rescued because of transmission-path failure; and packet-transmission halting means for halting transmission of the packet to the transmission path when communication has become unrescuable, wherein when communication cannot be rescued because of transmission-path failure in a point-to-multipoint drop connection that transmits the same packet from one, insert transmitting apparatus to a plurality of drop transmitting apparatuses, a packet-transmission halting means of said insert transmitting apparatus halts transmission of the packet to the transmission path.

9. The apparatus according to claim 8, wherein in a case where the same connection ID is not used in different spans of a network in a point-to-multipoint drop connection that transmits the same packet from one insert transmitting apparatus to a plurality of drop transmitting apparatuses, said rescue-impossible detection means of the insert transmitting apparatus decides that rescue has become impossible when a drop transmitting apparatus nearest to said insert transmitting apparatus resides in the signal non-arrival range.

10. The apparatus according to claim 8, further comprising failure reporting means, wherein a multipoint-to-point insert connection and point-to-multipoint drop connection are managed as a pair and, when a prescribed insert connection becomes unrescuable, said failure reporting means inserts a failure notification packet in the drop connection of the pair.

11. A transmitting apparatus in a ring network in which a plurality of transmitting apparatuses are connected in ring form so as to be capable of transmitting in each of upstream and downstream directions, working and protection channels are assigned to each direction and, when failure occurs in a transmission path, a transmit signal is looped back using the protection channel to effect rescue, said apparatus comprising:

rescue-impossible detection means for detecting that communication between an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side, cannot be rescued because of transmission-path failure; and packet-transmission halting means for halting transmission of the packet to the transmission path when communication has become unrescuable, wherein when communication cannot be performed because of multiple transmission-path failures in a multipoint-to-point insert connection that transmits packets from a plurality of insert transmitting apparatuses to one drop transmitting apparatus using the same connection ID, a packet-transmission halting means of each insert transmitting apparatus halts transmission of the packet to the transmission path.

12. A transmitting apparatus in a ring network in which a plurality of transmitting apparatuses are connected in ring form so as to be capable of transmitting in each of upstream and downstream directions, working and protection channels are assigned to each direction and, when failure occurs in a transmission path, a transmit signal is looped back using the protection channel to effect rescue, said apparatus comprising:

rescue-impossible detection means for detecting that communication between an insert transmitting apparatus that incorporates a packet, which enters from a lower-order side, into a higher-order signal and transmits the signal to a transmission path, and a drop transmitting apparatus that extracts the packet from the higher-order signal and transmits the packet to another lower-order side, cannot be rescued because of transmission-path failure; and packet-transmission halting means for halting transmission of the packet to the transmission path when communication has become unrescuable, wherein in a case where the same connection ID is not used in different spans of a network in a multipoint-to-point insert connection that transmits packets from a plurality of insert transmitting apparatuses to one drop transmitting apparatus using the same connection ID, said rescue-impossible detection means of each insert transmitting apparatus decides that rescue has become impossible when the drop transmitting apparatus resides in the signal non-arrival range.

* * * * *